United States Patent
Luo et al.

(10) Patent No.: US 11,395,199 B2
(45) Date of Patent: Jul. 19, 2022

(54) CONDITIONAL HANDOVER FOR MOBILE NETWORKS

(71) Applicant: QUALCOMM Incorporated, San Diego, CA (US)

(72) Inventors: Jianghong Luo, Skillman, NJ (US); Karl Georg Hampel, Hoboken, NJ (US); Junyi Li, Chester, NJ (US); Navid Abedini, Somerset, NJ (US); Luca Blessent, Whitehouse Station, NJ (US); Tao Luo, San Diego, CA (US); Naeem Aki, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/993,072

(22) Filed: Aug. 13, 2020

(65) Prior Publication Data

US 2021/0051545 A1 Feb. 18, 2021

Related U.S. Application Data

(60) Provisional application No. 62/888,117, filed on Aug. 16, 2019.

(51) Int. Cl.
*H04W 4/00* (2018.01)
*H04W 36/00* (2009.01)
(Continued)

(52) U.S. Cl.
CPC ..... *H04W 36/00837* (2018.08); *H04W 36/30* (2013.01); *H04W 76/11* (2018.02); *H04W 76/27* (2018.02); *H04W 88/14* (2013.01)

(58) Field of Classification Search
None
See application file for complete search history.

(56) References Cited

U.S. PATENT DOCUMENTS

| 2018/0279193 | A1  | 9/2018  | Park et al. |
| 2020/0389825 | A1* | 12/2020 | Higuchi ............... H04W 36/30 |
| 2021/0076271 | A1* | 3/2021  | Jokela ................. H04W 36/36 |

FOREIGN PATENT DOCUMENTS

| WO | WO-2019134163 A1 | 7/2019 |
| WO | WO-2020090988 A1 | 5/2020 |

OTHER PUBLICATIONS

International Search Report and Written Opinion—PCT/US2020/046539—ISA/EPO—dated Nov. 2, 2020.
(Continued)

*Primary Examiner* — Suhail Khan
(74) *Attorney, Agent, or Firm* — Danai Nelisile Mhembere; Holland & Hart LLP

(57) ABSTRACT

Methods, systems, and devices for wireless communications are described. In an integrated access and backhaul (IAB) network, a wireless node may receive an indication of a conditional handover configuration from a relay node. The conditional handover procedure may specify a set of trigger conditions for a conditional handover procedure supported by the relay node. The indication of the conditional handover may indicate a change of the cell from a first cell identifier to a second cell identifier. The wireless node may determine that a trigger condition of the set of trigger conditions is satisfied. The wireless node may then transmit, to the relay node, a random access message to initiate the conditional handover procedure for the cell from the first cell identifier to the second cell identifier.

30 Claims, 18 Drawing Sheets

(51) Int. Cl.
*H04W 76/11* (2018.01)
*H04W 76/27* (2018.01)
*H04W 88/14* (2009.01)
*H04W 36/30* (2009.01)

(56) References Cited

OTHER PUBLICATIONS

ITRI: "Service Interruption Minimization During Topology Adaptation", 3GPP Draft, R2-1817990, 3GPP TSG-RAN WG2 Meeting #104, Service Interruption Minimization, 3rd Generation Partnership Project (3GPP), Mobile Competence Centre, 650, Route Des Lucioles, F-06921 Sophia-Antipolis Cedex, France, vol. RAN WG2, No. Spokane, US, Nov. 12, 2018-Nov. 16, 2018, Nov. 12, 2018 (Nov. 12, 2018), XP051557498, 6 Pages, Retrieved from the Internet:URL:http://www.3gpp.org/ftp/Meetings%5F3GPP%5FSYNC/RAN2/Docs/R2%2D18179 90%2Ezip [retrieved on Nov. 12, 2018] the Whole Document.

NOKIA., et al., "IAB Integration", 3GPP Draft, R3-191387, 3GPP TSG-RAN WG2 Meeting #103bis, IAB Start-Up, 3rd Generation Partnership Project (3GPP), Mobile Competence Centre, 650, Route Des Lucioles, F-06921 Sophia-Antipolis Cedex, France, No. Xi 'an, China, Apr. 8, 2019-Apr. 12, 2019, Apr. 6, 2019 (Apr. 6, 2019), XP051702664, 6 Pages, Retrieved from the Internet:URL:http://www.3gpp.org/ftp/Meetings%5F3GPP%5FSYNC/RAN3/Docs/R3%2D19138 7%2Ezip [retrieved on Apr. 6, 2019] the Whole Document.

NOKIA., et al., "Service Interruption Time Minimization for Backhaul Links", 3GPP Draft, R2-1814998, 3GPP TSG-RAN WG2 Meeting #103bis, Service Interruption Time Minimization for Backhaul Links, 3rd Generation Partnership Project (3GPP), Mobile Competence Centre, 650, Route Des Lucioles, F-06921, Sophia-Antipol, vol. RAN WG2, No. Chengdu, China, Oct. 8, 2018-Oct. 12, 2018, Sep. 28, 2018 (Sep. 28, 2018), XP051524371, 7 Pages, Retrieved from the Internet:URL:http://www.3gpp.org/ftp/tsg%5Fran/WG2%5FRL2/TSGR2%5F103bis/Docs/R2%2D1814998%2Ezip [retrieved on Sep. 28, 2018] the Whole Document.

\* cited by examiner

CONDITIONAL HANDOVER FOR MOBILE NETWORKS

CROSS REFERENCE

The present application for patent claims the benefit of U.S. Provisional Patent Application No. 62/888,117 by Luo et al., entitled "CONDITIONAL HANDOVER FOR MOBILE NETWORKS," filed Aug. 16, 2019, assigned to the assignee hereof, and expressly incorporated by reference in its entirety herein.

FIELD OF TECHNOLOGY

The following relates generally to wireless communications, and more specifically to conditional handover for mobile networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A node of an integrated access and backhaul (IAB) network may serve a particular cell. The node and its respective cell may have a physical cell identifier (PCI). The PCI may be used to distinguish physical signals of a cell and physical channels transmitted via different cells (e.g., via cells associated with different PCIs). In some cases, however, PCI collisions may occur in an IAB network when two neighboring IAB cells utilize the same PCI. For example, a UE connected to cell with a PCI that is the same as a PCI of a neighboring cell may measure signals from both cells, but may be unable to distinguish between the cells themselves, which may result in inaccurate UE measurements for a given cell caused by signals being received from multiple cells associated with the same PCI.

SUMMARY

The described techniques relate to improved methods, systems, devices, and apparatuses that support conditional handover for mobile networks. Generally, the described techniques provide for resolving latency involved in an integrated access and backhaul (IAB) network when a physical cell identifier (PCI) associated with a serving cell changes. A wireless node (e.g., a user equipment (UE)) in an IAB network may be served by a serving cell supported by an IAB node. The serving IAB node may determine that the PCI corresponding to the cell of the IAB node is to change (e.g., due to a neighboring cell having a same PCI). The wireless node may receive an indication of a conditional handover configuration from the serving IAB node based on the change in PCI. The wireless node may transmit a random access message to initiate the conditional handover process based on the PCI change.

A method of wireless communications at a wireless node is described. The method may include receiving an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determining that a trigger condition of the set of trigger conditions is satisfied, and transmitting, to the relay node and based on the trigger condition being satisfied, a random access message to initiate the conditional handover procedure for the cell from the first cell identifier to the second cell identifier.

An apparatus for wireless communications at a wireless node is described. The apparatus may include a processor, memory coupled with the processor, and instructions stored in the memory. The instructions may be executable by the processor to cause the apparatus to receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determine that a trigger condition of the set of trigger conditions is satisfied, and transmit, to the relay node and based on the trigger condition being satisfied, a random access message to initiate the conditional handover procedure for the cell from the first cell identifier to the second cell identifier.

Another apparatus for wireless communications at a wireless node is described. The apparatus may include means for receiving an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determining that a trigger condition of the set of trigger conditions is satisfied, and transmitting, to the relay node and based on the trigger condition being satisfied, a random access message to initiate the conditional handover procedure for the cell from the first cell identifier to the second cell identifier.

A non-transitory computer-readable medium storing code for wireless communications at a wireless node is described. The code may include instructions executable by a processor to receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determine that a trigger condition of the set of trigger conditions is satisfied, and transmit, to the relay node and based on the trigger condition being satisfied, a random access message to initiate the conditional handover procedure for the cell from the first cell identifier to the second cell identifier.

Some examples of the method, apparatuses, and non-transitory computer-readable medium described herein may further include operations, features, means, or instructions for identifying a time duration after receipt of the conditional handover configuration for the wireless node to initiate the conditional handover procedure based on the set of trigger conditions, and determining that the trigger condition of the set of trigger conditions may be satisfied based on determining that the time duration after receipt of the conditional handover configuration may have elapsed.

Some examples of the method, apparatuses, and non-transitory computer-readable medium described herein may further include operations, features, means, or instructions for measuring a signal quality of a signal from the cell associated with the first cell identifier based on the set of trigger conditions, and determining that the trigger condition of the set of trigger conditions may be satisfied based on the signal quality being below a threshold signal quality.

Some examples of the method, apparatuses, and non-transitory computer-readable medium described herein may further include operations, features, means, or instructions for measuring a signal quality of a signal from the cell associated with the second cell identifier based on the set of trigger conditions, and determining that the trigger condition of the set of trigger conditions may be satisfied based on the signal quality being above a threshold signal quality.

Some examples of the method, apparatuses, and non-transitory computer-readable medium described herein may further include operations, features, means, or instructions for measuring a first signal quality of a first signal from the cell associated with the first cell identifier based on the set of trigger conditions, measuring a second signal quality of a second signal from the cell associated with the second cell identifier based on the set of trigger conditions, and determining that the trigger condition of the set of trigger conditions may be satisfied based on a difference between the first signal quality and the second signal quality satisfying a relative signal quality threshold.

Some examples of the method, apparatuses, and non-transitory computer-readable medium described herein may further include operations, features, means, or instructions for receiving the indication of the conditional handover configuration from the relay node or from a central node in an integrated access and backhaul system.

Some examples of the method, apparatuses, and non-transitory computer-readable medium described herein may further include operations, features, means, or instructions for receiving the indication of the conditional handover configuration in a radio resource control (RRC) message.

Some examples of the method, apparatuses, and non-transitory computer-readable medium described herein may further include operations, features, means, or instructions for establishing, as part of the conditional handover procedure, a connection with the relay node via the cell associated with the second cell identifier after a transition period of the cell from the first cell identifier to the second cell identifier.

Some examples of the method, apparatuses, and non-transitory computer-readable medium described herein may further include operations, features, means, or instructions for receiving, from the relay node and during the transition period, one or more signals associated with the first cell identifier and one or more signals associated with the second cell identifier.

Some examples of the method, apparatuses, and non-transitory computer-readable medium described herein may further include operations, features, means, or instructions for establishing, as part of the conditional handover procedure, a connection with the relay node via the cell associated with the second cell identifier after transmitting the random access message.

In some examples of the method, apparatuses, and non-transitory computer-readable medium described herein, the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof.

In some examples of the method, apparatuses, and non-transitory computer-readable medium described herein, the time duration indicates a number of slots, a number of frames, a number of symbols, or a time period following receipt of the conditional handover configuration.

In some examples of the method, apparatuses, and non-transitory computer-readable medium described herein, the wireless node may be a UE or a mobile termination (MT) function of an IAB node.

A method of wireless communications at a relay node is described. The method may include establishing a connection with a wireless node via a cell supported by the relay node, the cell associated with a first cell identifier, determining, based on a neighboring cell being associated with the first cell identifier, a change of the cell from the first cell identifier to a second cell identifier, and transmitting an indication of a conditional handover configuration that specifies a set of trigger conditions for a conditional handover procedure based on determining the change of the cell from the first cell identifier to the second cell identifier.

An apparatus for wireless communications at a relay node is described. The apparatus may include a processor, memory coupled with the processor, and instructions stored in the memory. The instructions may be executable by the processor to cause the apparatus to establish a connection with a wireless node via a cell supported by the relay node, the cell associated with a first cell identifier, determine, based on a neighboring cell being associated with the first cell identifier, a change of the cell from the first cell identifier to a second cell identifier, and transmit an indication of a conditional handover configuration that specifies a set of trigger conditions for a conditional handover procedure based on determining the change of the cell from the first cell identifier to the second cell identifier.

Another apparatus for wireless communications at a relay node is described. The apparatus may include means for establishing a connection with a wireless node via a cell supported by the relay node, the cell associated with a first cell identifier, determining, based on a neighboring cell being associated with the first cell identifier, a change of the cell from the first cell identifier to a second cell identifier, and transmitting an indication of a conditional handover configuration that specifies a set of trigger conditions for a conditional handover procedure based on determining the change of the cell from the first cell identifier to the second cell identifier.

A non-transitory computer-readable medium storing code for wireless communications at a relay node is described. The code may include instructions executable by a processor to establish a connection with a wireless node via a cell supported by the relay node, the cell associated with a first cell identifier, determine, based on a neighboring cell being associated with the first cell identifier, a change of the cell from the first cell identifier to a second cell identifier, and transmit an indication of a conditional handover configuration that specifies a set of trigger conditions for a conditional handover procedure based on determining the change of the cell from the first cell identifier to the second cell identifier.

Some examples of the method, apparatuses, and non-transitory computer-readable medium described herein may further include operations, features, means, or instructions for receiving, from the wireless node, a random access message as part of the conditional handover procedure, the random access message received based on a trigger condition of the set of trigger conditions being satisfied, and establishing, after receiving the random access message, a second connection with the wireless node via the cell associated with the second cell identifier as part of the conditional handover procedure.

Some examples of the method, apparatuses, and non-transitory computer-readable medium described herein may further include operations, features, means, or instructions for receiving, from a central node in communication with the relay node, an indication to change the cell from the first cell identifier to the second cell identifier, where determining the change of the cell from the first cell identifier to the second cell identifier based on the indication received from the central node.

Some examples of the method, apparatuses, and non-transitory computer-readable medium described herein may further include operations, features, means, or instructions for receiving, from a central node in communication with the relay node, the indication of the conditional handover configuration.

Some examples of the method, apparatuses, and non-transitory computer-readable medium described herein may further include operations, features, means, or instructions for transmitting the indication of the conditional handover configuration via an RRC message.

Some examples of the method, apparatuses, and non-transitory computer-readable medium described herein may further include operations, features, means, or instructions for transmitting, during a transition period after transmitting the indication of the conditional handover configuration, one or more signals associated with the first cell identifier.

Some examples of the method, apparatuses, and non-transitory computer-readable medium described herein may further include operations, features, means, or instructions for transmitting, during the transition period after transmitting the indication of the conditional handover configuration, one or more signals associated with the second cell identifier.

Some examples of the method, apparatuses, and non-transitory computer-readable medium described herein may further include operations, features, means, or instructions for transmitting one or more signals associated with the second cell identifier after transmitting the indication of the conditional handover configuration.

In some examples of the method, apparatuses, and non-transitory computer-readable medium described herein, the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof.

In some examples of the method, apparatuses, and non-transitory computer-readable medium described herein, the wireless node may be a UE or a MT function of an IAB node.

In some examples of the method, apparatuses, and non-transitory computer-readable medium described herein, the relay node may be an IAB node.

A method of wireless communications at a central node is described. The method may include identifying a first cell identifier of a cell supported by a relay node in communication with a wireless node and the central node, determining to change the cell from the first cell identifier to a second cell identifier based on a neighboring cell of the relay node being associated with the first cell identifier, and transmitting, to the relay node and based on determining, an indication to change the cell from the first cell identifier to the second cell identifier.

An apparatus for wireless communications at a central node is described. The apparatus may include a processor, memory coupled with the processor, and instructions stored in the memory. The instructions may be executable by the processor to cause the apparatus to identify a first cell identifier of a cell supported by a relay node in communication with a wireless node and the central node, determine to change the cell from the first cell identifier to a second cell identifier based on a neighboring cell of the relay node being associated with the first cell identifier, and transmit, to the relay node and based on determining, an indication to change the cell from the first cell identifier to the second cell identifier.

Another apparatus for wireless communications at a central node is described. The apparatus may include means for identifying a first cell identifier of a cell supported by a relay node in communication with a wireless node and the central node, determining to change the cell from the first cell identifier to a second cell identifier based on a neighboring cell of the relay node being associated with the first cell identifier, and transmitting, to the relay node and based on determining, an indication to change the cell from the first cell identifier to the second cell identifier.

A non-transitory computer-readable medium storing code for wireless communications at a central node is described. The code may include instructions executable by a processor to identify a first cell identifier of a cell supported by a relay node in communication with a wireless node and the central node, determine to change the cell from the first cell identifier to a second cell identifier based on a neighboring cell of the relay node being associated with the first cell identifier, and transmit, to the relay node and based on determining, an indication to change the cell from the first cell identifier to the second cell identifier.

Some examples of the method, apparatuses, and non-transitory computer-readable medium described herein may further include operations, features, means, or instructions for receiving, from a central entity, a signal that indicates the change of the cell from the first cell identifier to the second cell identifier.

Some examples of the method, apparatuses, and non-transitory computer-readable medium described herein may further include operations, features, means, or instructions for transmitting a conditional handover configuration to the wireless node based on the determining, where the conditional handover configuration includes one or more parameters of a conditional handover procedure to change the cell from the first cell identifier to the second cell identifier.

Some examples of the method, apparatuses, and non-transitory computer-readable medium described herein may further include operations, features, means, or instructions for transmitting the conditional handover configuration via RRC signaling.

In some examples of the method, apparatuses, and non-transitory computer-readable medium described herein, the conditional handover configuration includes a set of trigger conditions for the conditional handover procedure, where the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof.

Some examples of the method, apparatuses, and non-transitory computer-readable medium described herein may further include operations, features, means, or instructions for transmitting, to the relay node, an indication of a transition period for changing the cell from the first cell identifier to the second cell identifier.

In some examples of the method, apparatuses, and non-transitory computer-readable medium described herein, the transition period indicates a time period in which the relay node performs communications associated with both the first and second cell identifiers.

Some examples of the method, apparatuses, and non-transitory computer-readable medium described herein may further include operations, features, means, or instructions for transmitting the indication to change the cell from the first cell identifier to the second cell identifier via an application protocol interface.

In some examples of the method, apparatuses, and non-transitory computer-readable medium described herein, the wireless node may be a UE or a MT function of an IAB node.

DETAILED DESCRIPTION

Figure 1:
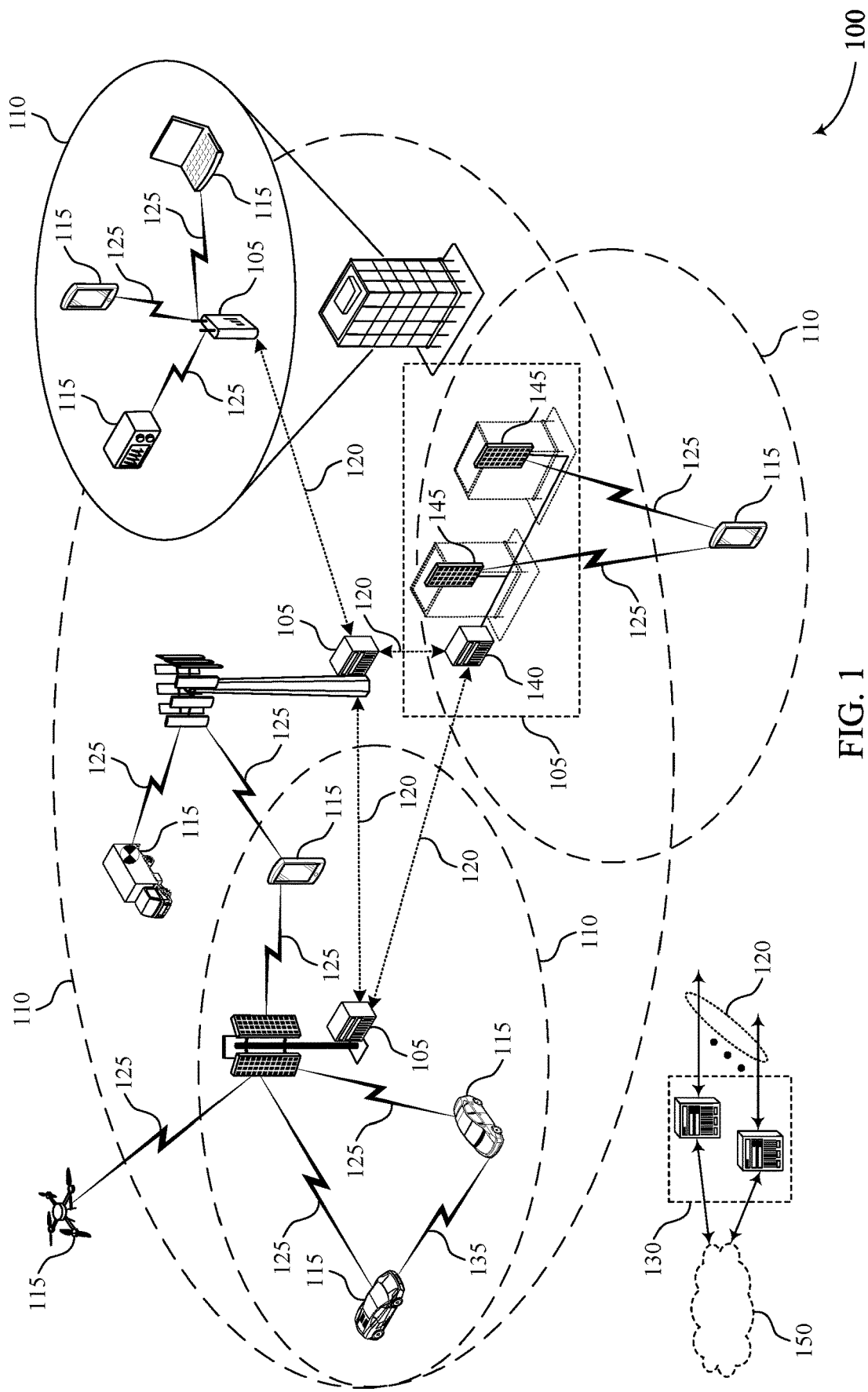
FIG. 1 illustrates an example of a wireless communications system that supports conditional handover for mobile networks in accordance with aspects of the present disclosure.

A wireless communications system (e.g., a New Radio (NR) system, a millimeter wave (mmW) system, etc.) may implement an integrated access and backhaul (IAB) network architecture. An IAB network may include a number of connected nodes to support network coverage, for example for a large geographic area. These IAB nodes may generally be referred to as base stations. A subset of these nodes may be donor nodes (donor nodes may also be called anchor nodes). A donor node may be connected to the core network via a wireline backhaul connection. The donor node may include a central unit (CU) and a distributed unit (DU). The DU may schedule communications in a cell, including communications for a user equipment (UE), a UE acting as a relay IAB node, or other IAB nodes (e.g., relay IAB nodes, access IAB nodes).

The relay IAB nodes may include a mobile termination (MT) and a DU. The MT may have similar functionality as a UE and may receive scheduling information from other IAB nodes (e.g., the donor node or other relay IAB nodes). The DU of the relay IAB node may schedule communications in a cell, including communications at one or more served UEs and relay IAB nodes.

A cell served by a relay IAB node may be associated with a physical cell identifier (PCI). There may be a set number of PCIs for a particular radio access technology (RAT), which may cause some cells in an IAB network to have the same PCI (e.g., PCIs may be repeated in an IAB network). In some cases, an IAB node may be a mobile IAB node supporting communications with another IAB node (e.g., a UE) via a serving cell. The mobile IAB node may have a unique PCI in some geographic areas but due to its mobility, may move into a region with another cell associated with the same PCI. In such instances, a UE served by the mobile IAB node may not be able to accurately receive and decode transmissions (e.g., to perform measurements of the cell serving the UE) from the mobile IAB node due to a second cell (e.g., supported by a different IAB node) overlapping in coverage with the cell serving the UE. The PCI of the mobile IAB node may be changed so that the UE may correctly receive and transmit communications with the mobile IAB node and so that the UE accurately performs cell measurements.

A conditional handover process may be performed in order to decrease latency for handovers involving a PCI change and to reduce interference from neighboring cells having a same PCI. In some cases, an IAB node DU may change its PCI for a cell (e.g., if two IAB-nodes have the same PCI and thus have a potential for PCI collision). In such cases, a UE may be served by a cell with an initial PCI before a PCI change. The UE may then be configured for a conditional handover procedure. A conditional handover configuration message may be transmitted in order to indicate a handover of the UE to a target cell (e.g., supported by the same IAB node) with a second PCI value. The conditional handover configuration message may also include trigger conditions to initiate the conditional handover procedure. The UE may detect a trigger condition (e.g., the UE may determine that a trigger condition is satisfied) and may initiate the conditional handover (e.g., the UE may transmit a random access message to the serving IAB node via a cell associated with the new PCI).

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to conditional handover for mobile networks.

FIG. 1 illustrates an example of a wireless communications system 100 that supports conditional handover for mobile networks in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, IAB nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different RAT).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode)

or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular RAT (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a PCI, a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Some implementations of wireless communications system 100 may include IAB features. In these cases, some base stations 105 may be examples of IAB nodes. An IAB node may be a relay IAB node, and may include DU aspects and MT aspects. An IAB node may also be a donor node, which may include CU and DU features. A DU of an IAB node may perform scheduling features similar to a base station 105. An MT of a relay node may act similarly to a UE 115 and may receive scheduling information from DUs of other IAB nodes. A DU of an IAB relay nodes may communicate scheduling to served UEs 115 and MTs of other IAB relay nodes. A cell served by an IAB node may be associated with a PCI. Some cells may have the same PCI. Some base stations 105 (e.g., IAB nodes) may be mobile.

Figure 2:
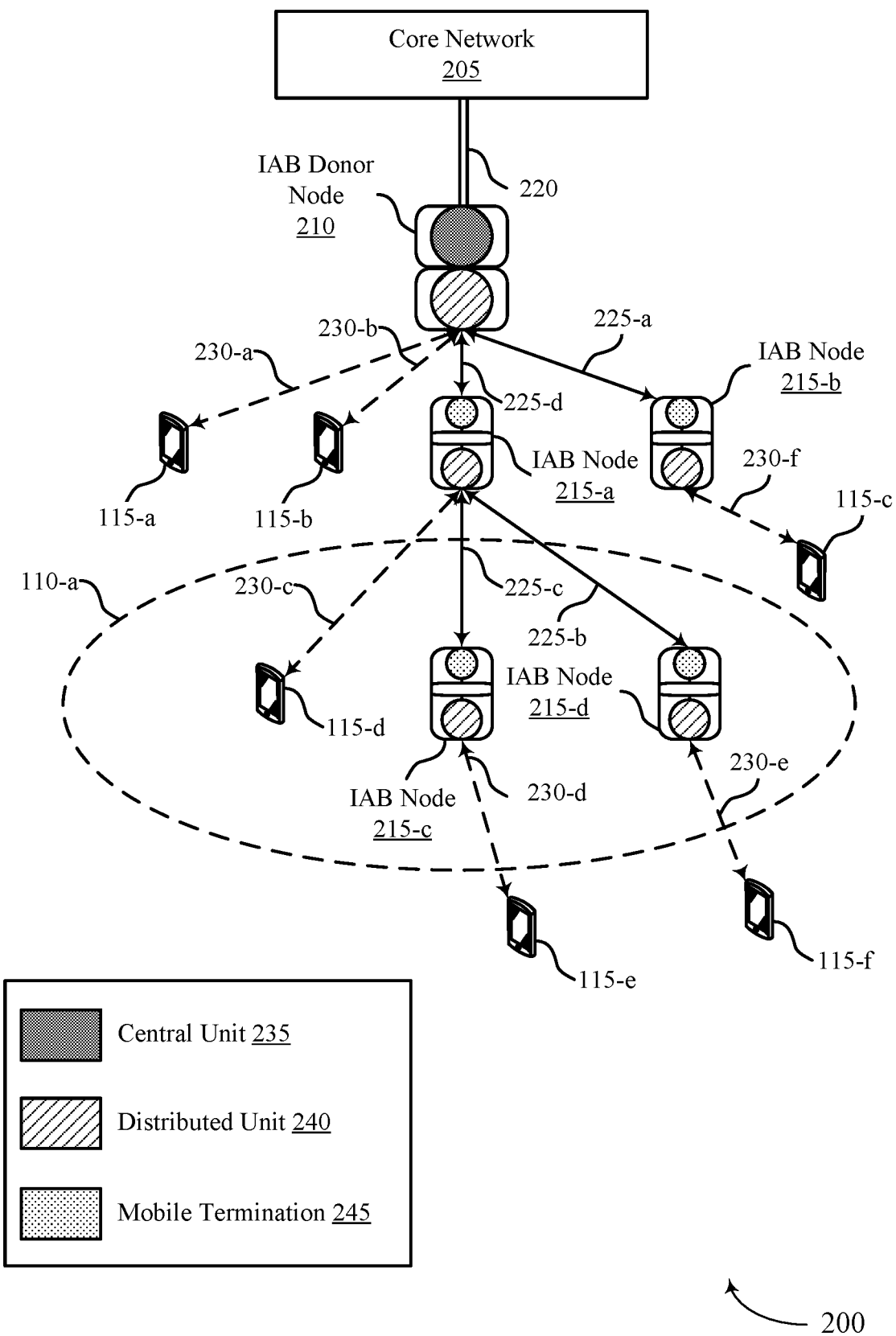
FIG. 2 illustrates an example of a wireless communications system that supports conditional handover for mobile networks in accordance with aspects of the present disclosure.

FIG. 2 illustrates an example of a wireless communications system 200 that supports conditional handover for mobile networks in accordance with aspects of the present disclosure. In some examples, wireless communications system 200 may implement aspects of wireless communications system 100. The wireless communications system 200 may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and IAB nodes such as donor IAB node 210 and IAB relay nodes 215, which may be examples of base stations 105 as described with reference to FIG. 1, or supported devices split into one or more support entities (i.e., functionalities) for promoting wireless backhaul density in collaboration with communication access. Aspects of the supporting functionalities of a base station may be referred to as IAB nodes, such as donor IAB nodes 210 and IAB nodes 215. In some cases, IAB nodes 215 (e.g., non-donor IAB nodes) may be referred to as IAB relay nodes. Wireless communications system 200 may additionally support UEs 115-*a*, 115-*b*, 115-*c*, 115-*d*, 115-*e*, and 115-*f*, which may be examples of UEs 115 as described with reference to FIG. 1. UEs 115 may communicate with one or more donor IAB nodes 210, IAB nodes 215, or a combination of these devices.

Wireless communications system 200 may include one or more donor IAB nodes 210, which may interface between a wireline network and a wireless network. In some cases, an donor IAB node 210 may be referred to as an anchor node, as the donor IAB node 210 anchors the wireless network to a wireline connection. Each donor IAB node 210 may include at least one wireline backhaul link 220 and one or more additional links (e.g., wireless backhaul links 225, backup wireless backhaul links, access links 230). In some cases, donor IAB node 210 may be an access node, as it has a wireline connection to the core network 205. donor IAB node 210 may have functions to control the IAB network (e.g., functionality of a base station such as an enhanced gNB). Donor IAB node 210 may be split into associated CU 235 and DU 240 entities, where DU 240 associated with donor IAB node 210 may be partially controlled by associated CU 235.

CU 235 may be a central entity in the IAB network. The CU 235 may control the IAB network. CU 235 of donor IAB node 210 may host layer 3 (L3) (e.g., RRC, service data adoption protocol (SDAP), PDCP) functionality and signaling. Further CU 235 of donor IAB node 210 may communicate with the core network 205 over wireline backhaul link 220. DUs 240 may host lower layer operations, such as layer 1 (L1) or layer 2 (L2) (e.g., RLC, MAC, physical (PHY) layer) functionality and signaling. DU 240 of donor IAB node 210 may support a serving cell within the network coverage area according to connections associated with wireless backhaul links 225 and access links 230 of the IAB network. DU 240 of the donor IAB node 210 may control both access and backhaul links within the corresponding network coverage and may provide controlling and scheduling for descendant (i.e., child) IAB nodes 215 (e.g., an IAB relay node) or UEs 115. For example, a DU 240 of donor IAB node 210 may support an RLC channel connection with UE 115-*a* via access link 230-*a*, with UE 115-*b* via access link 230-*b*, with IAB node 215-*a* via wireless backhaul link 225-*d*, and with IAB node 215-*b* via wireless backhaul link 225-*a*. A DU 240 may be a distributed scheduling node.

In some cases, wireless communications system 200 may include serving nodes (e.g., parent nodes) and descendant (i.e., child) IAB nodes 215 or UEs 115 (e.g., UE 115-*a*, 115-*b*, 115-*c*, 115-*d*, 115-*e*, or 115-*f* in RRC connected mode with a serving or parent node). A parent IAB node may be an donor IAB node 210 or an IAB node 215. A parent IAB node may have a coverage area 110, which may be an example of coverage areas 110 as described with reference to FIG. 1. For example, parent IAB node 215-*a* has coverage area 110-*a*, which includes UE 115-*d*, IAB node 215-*c*, and IAB node 215-*d*. A coverage area 110 for a an IAB node 215, or a donor IAB node 210 may be divided into sectors making up a portion of the geographic coverage area 110. Each sector may be associated with a cell. For example, IAB node 215-*d* may be in coverage area 110-*a* served by parent IAB node 215-*a*, but may also have coverage over a cell serving UE 115-*e*. A transition along a wireless backhaul link 225 (e.g., between parent node 215-*a* and child node 215-*c*) or a transition along an access link 230 (e.g., between parent node 215-*d* and child UE 115-*f*) may be considered a hop.

An IAB node 215 may be an example of an access node. In some cases, an IAB node 215 may relay traffic to or from an anchor node 210 via one or more hops. For example, IAB relay node 215-*c* may not be directly connected to a wireline backhaul 220. Instead, IAB relay node 215-*c* may connect to the core network 205 via other IAB nodes, such as IAB node 215-*a* using wireless backhaul links 225-*c* and 225-*d*. In other cases, an IAB node 215 may connect to core network 205 via any number of additional IAB relay nodes 215 and an donor IAB node 210 using wireless backhaul links 225.

An IAB node 215 may include one or both of MTs 245 or DUs 240. An MT 245 may behave as a scheduled node. For example, an MT 245 may behave similar to UE 115-*c* scheduled by its parent IAB node 215-*b*, or UE 115-*b* scheduled by its parent donor IAB node 210. In some cases, MT functionality of IAB relay nodes 215-*a*, 215-*b*, 215-*c* and 215-*d* may be controlled or scheduled by parent IAB nodes via wireless backhaul links 225. An IAB relay node 215 may transmit upstream (e.g., toward the core network 205) in the IAB system using MT functionality. For example, IAB node 215-*d* may use MT functionality to transmit uplink messaging along wireless backhaul link 225-*b* to IAB node 215-*a*.

In some cases, DUs 240 of the IAB nodes 215 may be partially controlled by signaling messages from a CU 235 corresponding to donor IAB node 210. The DUs 240 of the IAB nodes 215 may support serving cells of the network coverage area. For example, a DU 240 of IAB relay node 215-*a* may perform the same or similar functions as a DU 240 of donor IAB node 210. DU 240 of IAB node 215-*a* may support access link 230-*c* for UE 115-*d*, or one or more of wireless backhaul links 225-*c* and 225-*b* for downstream IAB relay nodes 215-*c* and 215-*d* respectively, or both. DUs 240 may be scheduling nodes within the IAB nodes 215. In some cases, a DU 240 may schedule child nodes 215 or child UEs 115 of the respective IAB node 215. For example, DU 240 of IAB node 215-*b* may schedule child UE 115-*c* via access link 230-*f*.

In some cases, an IAB network may include a mix of stationary or mobile IAB nodes 215. In these cases, mobile IAB nodes 215 may move around in an IAB network. For example, IAB nodes 215 may be installed on vehicles (e.g., a bus, train, or car). Such IAB nodes 215 may be called mobile IAB nodes 215. In some cases, a mobile IAB node 215 may be a "leaf" node in the IAB network. A leaf node may be a last hop IAB node 215 with child access UEs 115 connected to it. For example, IAB node 215-*c* may be a mobile IAB node 215 and may serve UE 115-*e* via access link 230-*d*. In this case, IAB node 215-*c* may be a leaf node.

In other cases, a mobile IAB node 215 may have another IAB node 215 as its child node. For example, IAB node 215-*a* may be a mobile IAB node 215 and may serve UE 115-*d* via access link 230-*c*, and IAB node 215-*a* may also serve IAB nodes 215-*c* and 215-*d* via wireless backhaul links 225-*c* and 225-*b* respectively. When a mobile IAB node 215 moves around the mobile IAB network, its parent node may change. For example, the parent node change may be done through a topology adaptation procedure.

UEs 115 or mobile IAB nodes 215 may move between multiple different cells or different coverage areas 110. In some cases, radio signals of a neighboring cell (i.e., a target cell), may provide an enhanced connection with a UE 115 relative to a current cell (e.g., source cell). In these cases, the UE 115 may be handed over from the source cell to the target cell (e.g., a UE 115 may be handed over to or from a base station 105, IAB node 215, donor IAB node 210, etc.). For example, if radio signals from IAB node 215-a may provide enhanced coverage for UE 115-c, UE 115-c may be handed over from source IAB node 215-b to target IAB node 215-a. Such techniques may be referred to as handover procedures. Handover procedures may help provide continuous connectivity to a UE 115 as it moves in wireless communications system 200.

In some cases, (e.g., handover in NR systems) the decision to perform a handover may be made by the core network 205. The decision to perform a handover may be triggered by a measurement report transmitted by a UE 115. A UE 115 may measure one or more channels to monitor channel quality of other channels. The measurement report transmitted by a UE 115 may include a report of channel quality index (CQI), which may indicate if channel conditions at the source cell and the target cell meet handover criteria. For example, the measurement report may indicate another channel, coverage area 110, cell, IAB node 215, etc., has higher quality than the current serving channel, coverage area 110, cell, IAB node 215, etc. Based on the measurement report, the core network 205 may transmit a handover message, such as an RRC re-configuration message, to indicate to the source cell to establish a second connection with a second cell. The RRC re-configuration message may be sent to initiate handover of the UE 115 from the source cell to the target cell. The UE 115 may then initiate a random access channel (RACH) procedure with the target cell. The UE 115 may transmit an RRC Re-configuration Complete message to the target cell after the RACH procedure.

A PCI may be an identification for a cell (e.g., a coverage area 110). There may be different options for PCI values supported by the wireless communications system 200 (e.g., in an NR system, a PCI may have 1008 total supported values). In some cases, multiple cells may be geographically separated in a network, but may reuse the same PCI. In such cases, cells with the same PCI may be distinguished by their unique Cell Global Identifiers (CGIs). In the case of NR networks, cells with the same PCI may be distinguished by different NR CGIs (NCGIs). A PCI may be carried by the primary synchronization signal (PSS) or the secondary synchronization signal (SSS) in a synchronization signal block (SSB).

In some cases, signals or physical channels may be "scrambled" (e.g., signals from multiple UEs 115 to a base station 105 or an IAB node 215, an donor IAB node 210, etc., may be interleaved or multiplexed in time or frequency). A PCI may be used to determine a scrambling sequence of many physical signals or physical channels (e.g., a scrambling seed). A PCI may be used as a scrambling seed for multiple types of transmissions (e.g., physical broadcast channel (PBCH), physical downlink control channel (PDCCH) CoreSet0, or cell-specific physical downlink shared channel (PDSCH) transmissions). In cases of other channels and transmission types, a different configured scrambling seed may be used.

A PCI collision may occur when two neighboring cells have the same PCI. For example, a UE 115 may not be able to differentiate reference signals transmitted from two neighboring cells using the same PCI. A PCI collision may lead to issues on timing synchronization or channel estimation. Additionally or alternatively, a PCI collision may cause decoding failure of data traffic which may be transmitted from one of the two neighboring cells. In some cases, if two neighboring cells use the same PCI, the same scrambling sequence for reference signals may be generated for each.

There may be increased potential for a PCI collision issue between IAB nodes 215 (e.g., between a mobile IAB node 215 and a stationary IAB node 215) when a mobile IAB node 215 moves around in an IAB network. For example, an IAB node 215 may be on a vehicle, such as a car, bus, or train. As a result, a DU 240 of a respective IAB node 215 may change its PCI for a cell. As a mobile IAB node 215 moves around an IAB network, a handover of the UE 115 from a source cell to a target cell may be performed.

In some examples, a PCI of a serving cell may change. Data service may be interrupted in cases where an MT 245 or a UE 115 may try to communicate with a serving cell based on a first PCI of the serving cell. However, the PCI of the serving IAB node 215 may have changed, which may result in radio link failure (RLF). The UE 115 or MT 245 may then reconnect to the serving cell with the changed PCI using a cell reselection procedure. Conditional handover techniques may be used in order to avoid causing interference or interrupting data service to a UE 115 due to a PCI change of a serving cell. Conditional handover techniques may also be used to reduce latency. In such cases, a UE 115 may be handed over from a serving cell with a first PCI supported by an IAB node to a second serving cell with a second PCI different from the first PCI, which may be supported by the same IAB node.

In these cases, a conditional handover configuration may be sent to a UE before handover is performed. A conditional handover configuration may include information such as candidate target cell configuration and conditional thresholds to trigger handover. A UE 115 may initiate a RACH procedure with the target cell if the configured handover condition (e.g., a trigger condition) is met. In some examples, conditional handover techniques may not include RRC configuration or a measurement report sent by the UE 115.

A UE 115 may be configured with conditional handover in order to improve latency during handovers involving PCI change. For example, a DU 240 of IAB node 215-c may change its PCI for its respective cell if neighboring IAB-node 215-d has the same PCI (e.g., if IAB nodes 215-c and 215-d have potential for PCI collision). Thus, UE 115-e connected to serving IAB node 215-c via a first cell having a first PCI using access link 230-d may be configured with a conditional handover configuration from IAB node 215-c indicating a target cell associated with a second PCI supported by IAB node 215-c. The conditional handover configuration message may include triggering conditions for handover.

Figure 3:
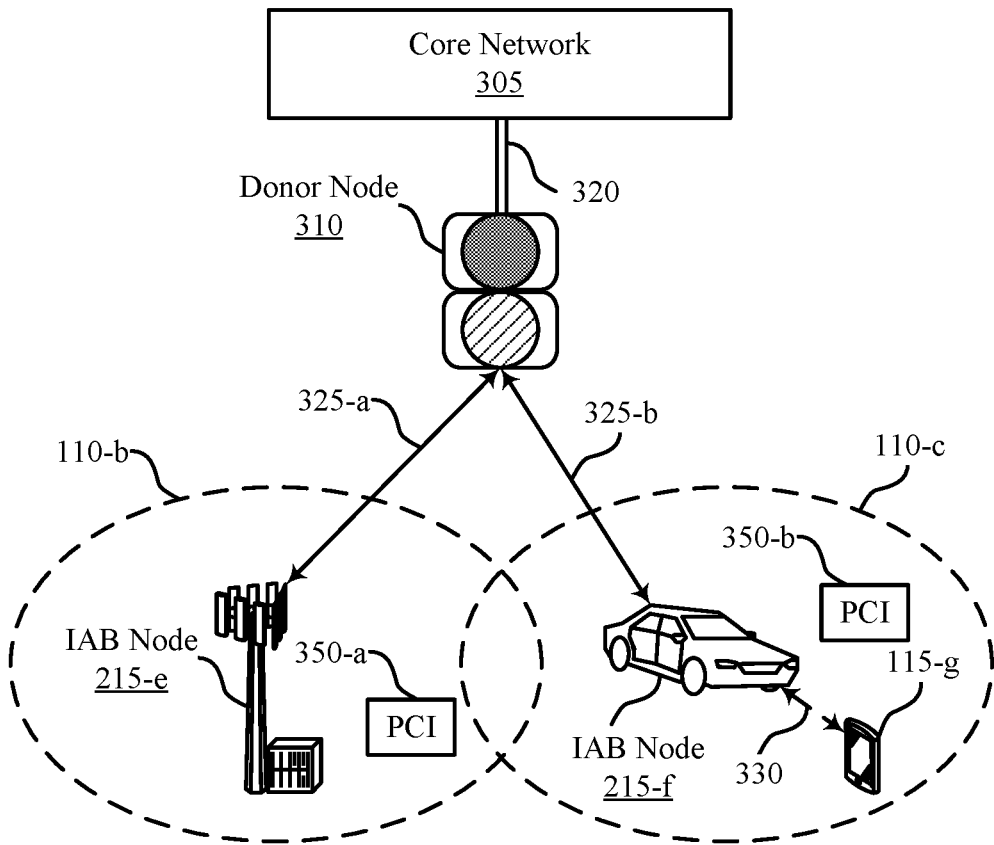
FIG. 3 illustrates an example of a wireless communications system that supports conditional handover for mobile networks in accordance with aspects of the present disclosure.
Figure 3:
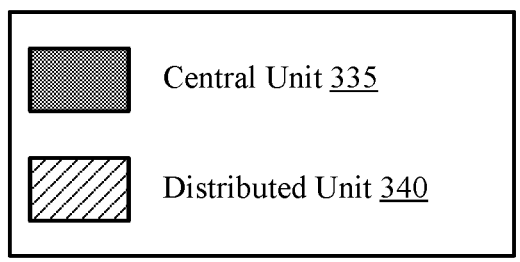

FIG. 3 illustrates an example of a wireless communications system 300 that supports conditional handover for mobile networks in accordance with aspects of the present disclosure. In some examples, wireless communications system 300 may implement aspects of wireless communications systems 100 and 200. The wireless communications system 300 may supplement wireline backhaul connections (e.g., wireline backhaul links 320) by sharing infrastructure and spectral resources for network access with wireless backhaul link capabilities, providing an IAB network architecture. Wireless communications system 300 may include a core network 305, donor IAB node 310, and IAB nodes 215 as described with reference to FIGS. 1 and 2, or supported devices split into one or more support entities (i.e., functionalities) for promoting wireless backhaul density in collaboration with communication access. Aspects of the supporting functionalities of a base station may be referred to as IAB nodes, such as donor IAB node 310 and IAB nodes 215. In some cases, IAB nodes 215 (e.g., non-donor IAB nodes) may be referred to as IAB relay nodes. Wireless communications system 300 may additionally support UE 115-g, which may be an example of a UE 115 as described with reference to FIGS. 1 and 2. UEs 115 may communicate with one or more donor IAB nodes 310, IAB nodes 215, or a combination of these devices.

Wireless communications system 300 may include donor IAB node 310, which may be an example of donor IAB node 210 as described with reference to FIG. 2. donor IAB node 310 may have CU 335 and DU 340, which may be an example of CU 235 and DU 240 with respect to FIG. 2. Wireless communications system 300 may also include IAB nodes 215-e and 215-f, which may be examples of IAB nodes 215 as described with reference to FIG. 2. For example, IAB node 215-e is connected to donor IAB node 310 via wireless backhaul link 325-a. An IAB relay node 215 may not be directly connected to a wireline backhaul 320. Instead, the IAB relay node 215 may connect to the core network 305 via other IAB nodes (e.g., any number of additional IAB relay nodes 215 and an donor IAB node 310) using wireless backhaul links 325.

In some cases, an IAB network may include a mix of stationary or mobile IAB nodes 215. In these cases, IAB nodes 215 may move around in a mobile IAB network. For example, IAB nodes 215 may be installed on vehicles (e.g., a bus, train, or car). For example, IAB node 215-f may be installed on a vehicle that may move around the IAB network, thus IAB node 215-f may be a mobile IAB node. In some cases, a mobile IAB node 215 may be a "leaf" node in the IAB network.

In some cases, wireless communications system 300 may include cells corresponding to IAB node 215-e and mobile IAB node 215-f. An IAB node 215 may support a cell over a coverage area 110. IAB nodes 215 and corresponding cells may be associated with given PCIs 350. A PCI 350 may be an identification for the cell or the IAB node 215. For example, PCI 350-a may be an identification for IAB node 215-e or its respective cell. Cells or IAB nodes 215 may select associated PCIs, or the PCI 350 may be selected for the cell by a parent/donor node 310 or by the core network 305.

A PCI 350 may be used to determine a scrambling sequence of physical signals or physical channels. For example, PCI 350-a may be a scrambling seed for physical signals or physical channels transmitted to or from IAB node 215-f and UE 115-g via access link 330.

A PCI collision may occur when two neighboring cells have the same PCI 350. For example, IAB node 215-e and its respective cell may be associated with PCI 350-a which may be the same as PCI 350-b associated with mobile IAB node 215-f and its respective cell. UE 115-g may not be able to differentiate reference signals transmitted from two neighboring cells using the same PCI 350. A PCI collision may lead to issues on timing synchronization or channel estimation.

In some cases, when two neighboring cells have the same PCI 350, the same scrambling sequence (e.g., a scrambling sequence for reference signals) may be generated and used for transmission of signals (e.g., reference signals) on both cells. For example, a UE 115 connected to a mobile IAB node 215 may measure signals from both its serving cell and a neighboring cell with the same PCI. UE 115-g may be connected to mobile IAB node 215-f via access link 330 via a respective cell. Mobile IAB node 215-f may correspond to PCI 350-b that may be the same as PCI 350-a of a cell supported by IAB node 215-e. Thus, UE 115-g may be measuring signals from both its serving IAB node 215-f and neighbor IAB node 215-e. UE 115-g may not be able to differentiate the signals received from the two respective cells. In such cases, UEs 115 connected to neighboring cells with the same PCIs 350 may experience interference during may measure the incorrect reference signals. Thus, a PCI 350 of a cell may be changed.

In some stationary IAB networks (e.g., networks with stationary IAB nodes 215), predetermined network planning may assign PCIs 350 to cells so there may be little to no potential for a PCI collision. There may be increased potential for a PCI collision issue between IAB nodes 215 (e.g., between a mobile IAB node 215 and a stationary IAB node 215) when a mobile IAB node 215 (e.g., mobile IAB node 215-f) moves around the IAB network. As a result, a DU 340 of a respective IAB node 215 may change its PCI 350 for the corresponding cell.

In these cases, if a PCI 350 of a serving cell is changed, a UE 115 may be handed over from a serving cell with a first PCI 350 to a serving cell with a second PCI 350. For example, UE 115-g may be connected via access link 330 to mobile IAB node 215-f with PCI 350-b as it moves around the IAB network. Mobile IAB node 215-f may move toward IAB node 215-e, which may have PCI 350-a that is the same as PCI 350-b. In such cases, PCI 350-b of mobile IAB node 215-f may be changed to a second PCI 350. The determination to change the PCI of a cell supported by mobile IAB node 215-f may be performed by the mobile IAB node 215-f itself or another node of the IAB network (e.g., donor IAB node 310, a node of the core network 305, or other relay or IAB node of the IAB network). Thus, UE 115-g may be handed over from a cell of IAB node 215-f with PCI 350-b to a second cell supported by the same IAB node 215-f but associated with a second PCI 350-b different from PCI 350-a. Such techniques may be referred to as conditional handover and conditional handover techniques may be used in order to avoid causing interference or interrupting data service to a UE 115 due to a PCI change of a serving cell. Conditional handover techniques may also be used in order to reduce latency.

In some cases (e.g., conditional handover in NR), a conditional handover configuration may be sent to a UE 115 before the handover occurs. A conditional handover configuration may include information such as candidate target cell configuration and conditional thresholds to trigger handover. A UE 115 may initiate a RACH procedure with the target cell if the configured handover condition is met. In some examples, conditional handover techniques may not include RRC configuration or a measurement report sent by the UE 115.

A UE 115 may be configured with conditional handover in order to improve latency during handovers involving a PCI change. For example, a DU 340 of a corresponding IAB node 215 may change its PCI 350 for a cell (e.g., if two IAB nodes 215 have potential for PCI collision). An RRC-connected UE 115 served by a cell with a first PCI 350 may be configured with conditional handover to a target cell with a second PCI 350. In some examples, the serving cell and the target cell may be supported by the same IAB node, but may be associated with different PCIs.

The conditional handover configuration message may include one or more different triggering conditions for handover. One triggering condition may be based on a specific time a UE 115 may start a handover (e.g., a number of time slots, frames, or milliseconds (ms) after the conditional handover configuration is received). Additionally or alternatively, a triggering condition may be based on a signal quality of a serving cell with a first PCI 350, or based on signal quality of a target cell with a second PCI 350 (e.g., if the signal quality of either cell with a first or second PCI 350, measured based on SSB or CSI-RS, is below a particular threshold). In another example, the triggering conditions may be based on relative signal quality between two cells with first and second PCI 350 values (e.g., if the signal quality of a target cell with a second PCI 350, measured based on SSB or CSI-RS, exceeds that of a serving cell with a first PCI 350 over a particular threshold).

In some cases, a conditional handover message may be sent from an IAB node 215 to a UE 115. The conditional handover message may include the triggering conditions. In one case, an IAB node 215 may be maintained as a relay node as previously described. A CU of a respective donor IAB node 310 may initiate transmission of a conditional handover configuration message using RRC. For example, if the CU 335 of donor IAB node 310 is the decision node that determines to change PCI 350-b, the CU may trigger the transmission of a conditional handover configuration message directly. CU 335 of donor IAB node 310 may transmit the conditional handover configuration message via wireless backhaul link 325-b to IAB node 215-f, and via access link 330 to UE 115-g. In another example, a CU 335 of a respective donor IAB node 310 may receive an indication of a PCI change from a decision node. Thus, the conditional handover configuration may be triggered by an CU 335 in response to an indication from a decision node (e.g., another IAB node 215 or donor IAB node 310).

An IAB node 215 may also be enhanced with some RRC functions. Thus, transmission of a conditional handover configuration message using RRC may be initiated by the enhanced IAB node 215 itself. For example, IAB node 215-f may have enhanced RRC functions and may be a decision node. Thus, IAB node 215-f may determine to initiate the change of PCI 350-b. A conditional handover configuration message may thus be triggered by an enhanced IAB node 215 directly. In another case, an enhanced IAB node 215 may receive an indication of a PCI change from a decision node. Thus, a conditional handover configuration message may be triggered by an enhanced IAB node 215 in response to an indication from a decision node.

Thus, in some cases, a decision to initiate a PCI change may be made by a central entity in a centralized approach. In other cases, a decision on PCI change may be made by an IAB node 215 itself to change the PCI 350 of the IAB node 215 or a respective cell in a distributed approach. In one example, mobile IAB node 215-f may decide to change the value of PCI 350-b on its own and may initiate transmission of a conditional handover configuration message. In a second example, donor IAB node 310 may act as a decision node and decide to change the value of PCI 350-b. Donor IAB node 310 may transmit an indication of the PCI change decision via wireless backhaul 225-b, then IAB node 215-f may initiate transmission of a conditional handover configuration message via access line 330 in response to the decision for PCI change.

A conditional handover procedure may be used for a "hard PCI change," or a "soft PCI change." An example of a "hard PCI change" may include a DU 340 of a respective IAB node 215 transmitting in two different cells consecutively. In this case, the DU 340 may first stop transmission via a cell having a first PCI 350, then begin transmissions via a cell having a second PCI 350. A "soft PCI change" may occur when there is a transition period of time during which the DU 340 of the IAB node 215 may transmit via two cells concurrently (e.g., overlapping during a given time or within the same time interval (e.g., within a transition period)). In this example, one cell may be associated with a first PCI 350 value, and the other cell may be associated with second PCI 350 value and the IAB node 215 may transmit reference signals for each PCI 350 during a transition period. Thus, the conditional handover procedure may be performed in order to decrease latency and interference during handovers involving PCI changes in IAB networks.

Figure 4:
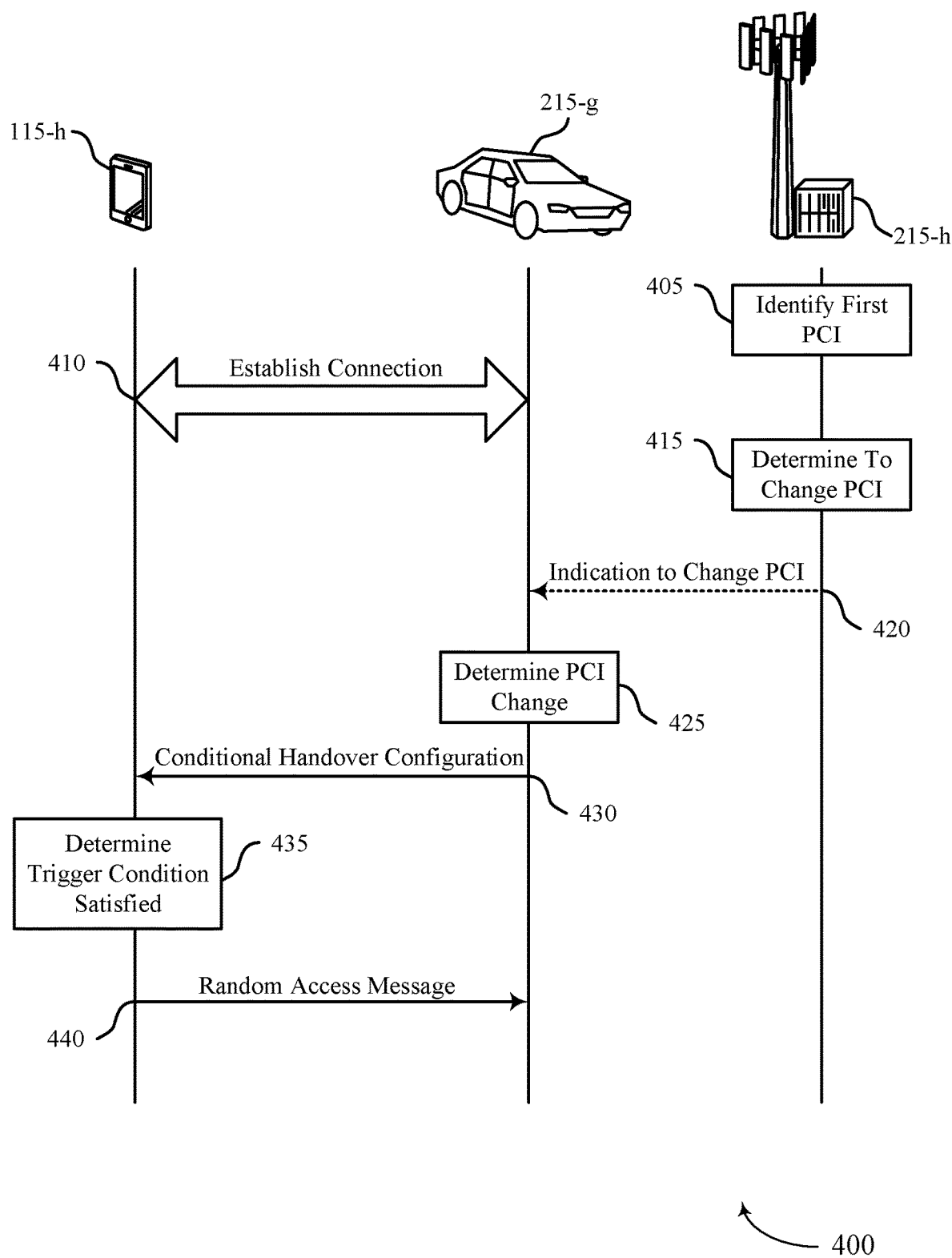
FIG. 4 illustrates an example of a process flow that supports conditional handover for mobile networks in accordance with aspects of the present disclosure.

FIG. 4 illustrates an example of a process flow 400 that supports conditional handover for mobile networks in accordance with aspects of the present disclosure. In some examples, process flow 400 may implement aspects of wireless communications systems 100, 200, and 300. The process flow 400 may illustrate an example of conditional handovers in IAB networks that include mobile IAB nodes and PCI changes. Process flow 400 may include IAB nodes 215-g and 215-h. These may be examples of IAB nodes 215 as described with reference to FIGS. 1, 2, and 3. IAB node 215-g may be a relay node in an IAB system. IAB node 215-h may be a central node in an IAB system. Process flow 400 may include UE 115-h, which may be an example of UEs 115 with reference to FIGS. 1, 2, and 3. UE 115-h may be an example of a wireless node. An MT function of an IAB node may also be an example of a wireless node or of UE 115-h. Alternative examples of the following may be implemented, where some steps are performed in a different order than described or are not performed at all. In some cases, steps may include additional features not mentioned below, or further steps may be added.

At 405, central node 215-h may identify a first cell identifier (e.g., a PCI) of a cell supported by relay node (e.g., IAB relay node 215-g) in communication with a wireless node (e.g., UE 115-h) and the central node 215-h. The central node 215-h may be an IAB node in an IAB network, or may be a node of a core network of the IAB network, or may be integrated within the IAB relay node 215-g.

At 410, IAB relay node 215-g may establish a connection with a wireless node (e.g., UE 115-h) via a cell supported by the IAB relay node 215-g. The cell may be associated with a first cell identifier (e.g., a first PCI). The wireless node may be a UE or an MT function of an IAB node.

At 415, central node 215-h may determine to change the cell from the first cell identifier to a second cell identifier (e.g., determine to change the cell from the first PCI to a second PCI) based on a neighboring cell of the central node 215-h being associated with the first cell identifier. Central node 215-h may receive a signal from a central entity (e.g., a donor IAB node, or the central network) that indicates the change of the cell from the first cell identifier to the second cell identifier.

At 420, central node 215-h may optionally transmit, to IAB relay node 215-g, an indication to change the cell from the first cell identifier to the second cell identifier. Relay node 215-g may receive, from the central node 215-h, the indication of the conditional handover configuration. Central node 215-h may transmit the indication based on the determining to change the cell identifier. The indication may be transmitted via an application protocol interface. Central IAB node 215-h may transmit an indication of a transition period for changing the cell from the first cell identifier to the second cell identifier. The indication of a transition period may indicate a time period in which the relay node 215-g may perform communications associated with both the first and second cell identifiers.

At 425, IAB relay node 215-g may determine, based on a neighboring cell being associated with the first cell identifier, a change of the cell from the first cell identifier to a second cell identifier. IAB relay node 215-g may receive, from central IAB node 215-h, an indication to change the cell from the first cell identifier to the second cell identifier. IAB relay node 215-g may determine to change cell identifier based on the indication received from the central IAB node 215-h. IAB relay node 215-g may receive, from central node 215-h, an indication of a conditional handover configuration. The conditional handover configuration may be transmitted by central IAB node 215-h based on the determining to change the cell from the first cell identifier to the second cell identifier. The conditional handover may include one or more parameters of a conditional handover procedure to change the cell from the first cell identifier to the second cell identifier. Additionally or alternatively, the conditional handover configuration may include a set of trigger conditions. The indication of a conditional handover configuration may be transmitted by central IAB node 215-h via an RRC message.

At 430, IAB relay node 215-g may transmit, to UE 115-h, the indication of the conditional handover configuration that specifies the set of trigger conditions for a conditional handover procedure. The indication may be transmitted based on determining the change of the cell from the first cell identifier to the second cell identifier. The indication of conditional handover configuration may be transmitted in an RRC message. In some cases, UE 115-h may receive the indication of the conditional handover configuration from the central node in the IAB system.

UE 115-h may receive an indication of the conditional handover configuration that specifies a set of trigger conditions for a conditional handover procedure for the cell supposed by relay node 215-g. The indication of the conditional handover configuration may indicate a change of the cell from the first cell identifier to the second cell identifier. UE 115-h may receive the indication of the conditional handover configuration in an RRC message.

The set of trigger conditions included in the conditional handover configuration may include a time duration after receipt of the conditional handover configuration for the UE 115-h to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof. The time duration may indicate a number of slots, a number of frames, a number of symbols, or a time period following receipt of the conditional handover configuration.

UE 115-h may identify the time duration after receipt of the conditional handover configuration for the UE 115-h to initiate the conditional handover procedure based on the set of triggering conditions. In some examples, during the transition period after transmitting the indication of the conditional handover configuration, relay node 215-g may transmit, to UE 115-h, one or more signals associated with the first cell identifier. Additionally or alternatively, relay node 215-g may transmit, to UE 115-h, one or more signals associated with the second cell identifier after transmitting the indication of the conditional handover configuration. UE 115-h may receive, from relay node 215-g and during the transition period, one or more signals associated with the first cell identifier and one or more signals associated with the second cell identifier. Central IAB node 215-h may transmit, during the transition period after transmitting the indication of the conditional handover configuration, one or more signals associated with the first cell identifiers. Central IAB node 215-h may transmit, during the transition period after transmitting the indication of the conditional handover configuration, one or more signals associated with the second cell identifier.

In some cases, UE 115-h may measure a signal quality of a signal from the cell associated with the first cell identifier based on the based on the set of trigger conditions. UE 115-h may also measure a signal quality of a signal from the cell associated with the second cell identifier based on the set of trigger conditions.

In some cases, UE 115-h may measure a first signal quality of a first signal from the cell associated with the first cell identifier based on the set of trigger conditions, and UE 115-h may measure a second signal quality of a second signal from the cell associated with the second cell identifier base on the set of trigger conditions. UE 115-h may establish, as part of the conditional handover procedure, a connection with relay node 215-g via the cell associated with the second cell identifier after the transition period of the cell from the first cell identifier to the second cell identifier.

At 435, UE 115-h may determine that a trigger condition of the set of trigger conditions is satisfied after receiving the indication of the conditional handover configuration in an RRC message from IAB relay node 215-g or central IAB node 215-h. In one case, UE 115-h may determine the trigger condition of the set of trigger conditions is satisfied based on determining that the time duration after receipt of the conditional handover configuration has elapsed. In another case, UE 115-h may determine that the trigger condition of the set of trigger conditions is satisfied based on the measured first signal quality of the first signal from the cell associated with the first identifier being below a threshold signal quality. UE 115-h may determine that the trigger condition of the set of trigger conditions is satisfied based on the measured second signal quality of the second signal from the cell associated with the second identifier being above a threshold signal quality. In a third case, UE 115-h may determine that the trigger condition is satisfied based on a difference between the first signal quality and the second signal quality satisfying a relative signal quality threshold.

At 440, UE 115-h may transmit, to the IAB relay node 215-g, a random access message to initiate the conditional handover procedure for the cell from the first cell identifier to the second cell identifier. UE 115-h may transmit the random access message based on the trigger condition of the set of trigger conditions being satisfied. IAB relay node 215-g may receive the random access message as part of the conditional handover procedure. The random access message may be received based on a trigger condition of the set of trigger conditions being satisfied. After receiving the random access message, IAB relay node 215-g may establish, as part of the conditional handover procedure, a second connection with UE 115-h via the cell associated with the second cell identifier.

Figure 5:
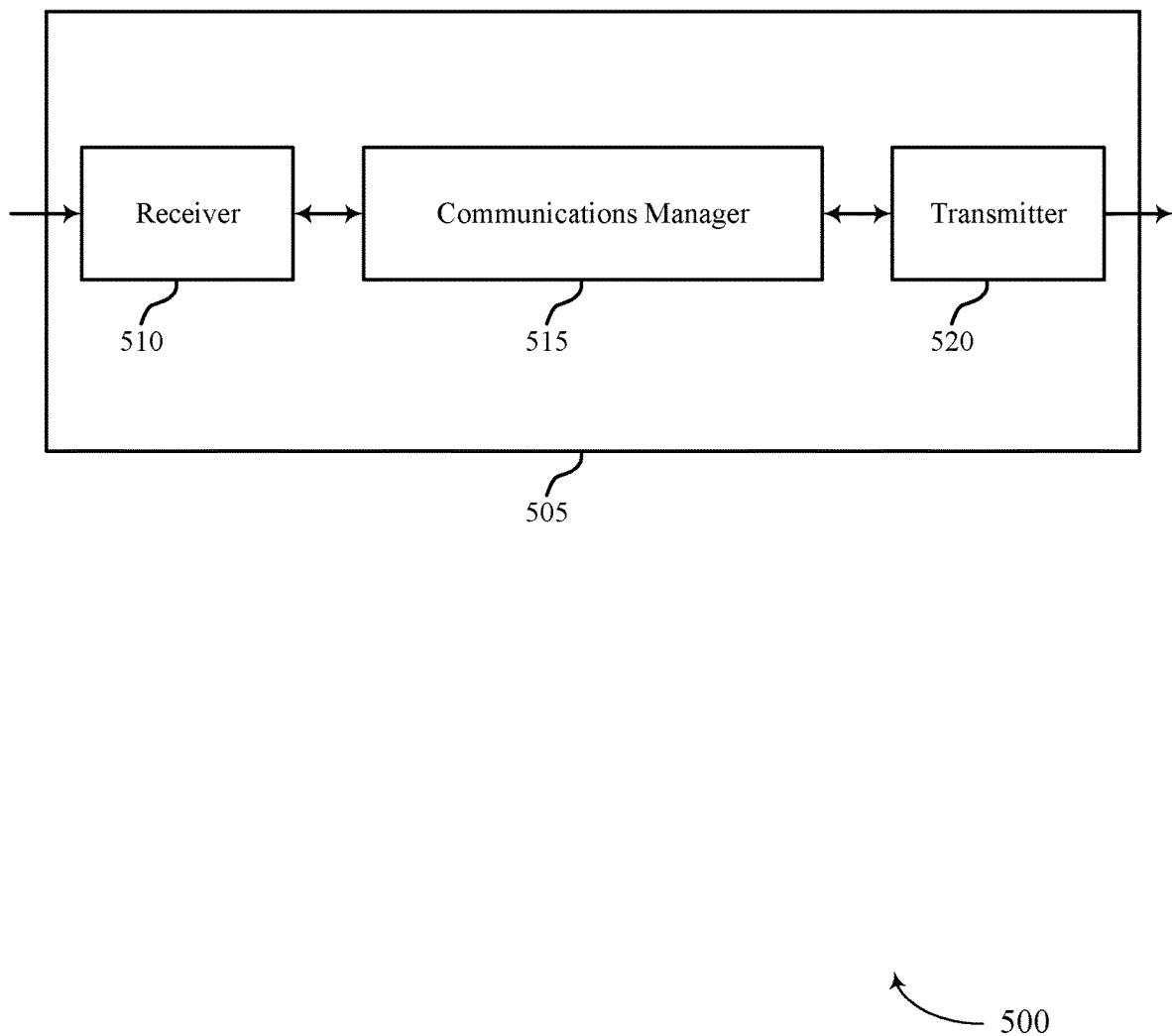
FIGS. 5 and 6 show block diagrams of devices that support conditional handover for mobile networks in accordance with aspects of the present disclosure.

FIG. 5 shows a block diagram 500 of a device 505 that supports conditional handover for mobile networks in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to conditional handover for mobile networks, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determine that a trigger condition of the set of trigger conditions is satisfied, and transmit, to the relay node and based on the trigger condition being satisfied, a random access message to initiate the conditional handover procedure for the cell from the first cell identifier to the second cell identifier. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
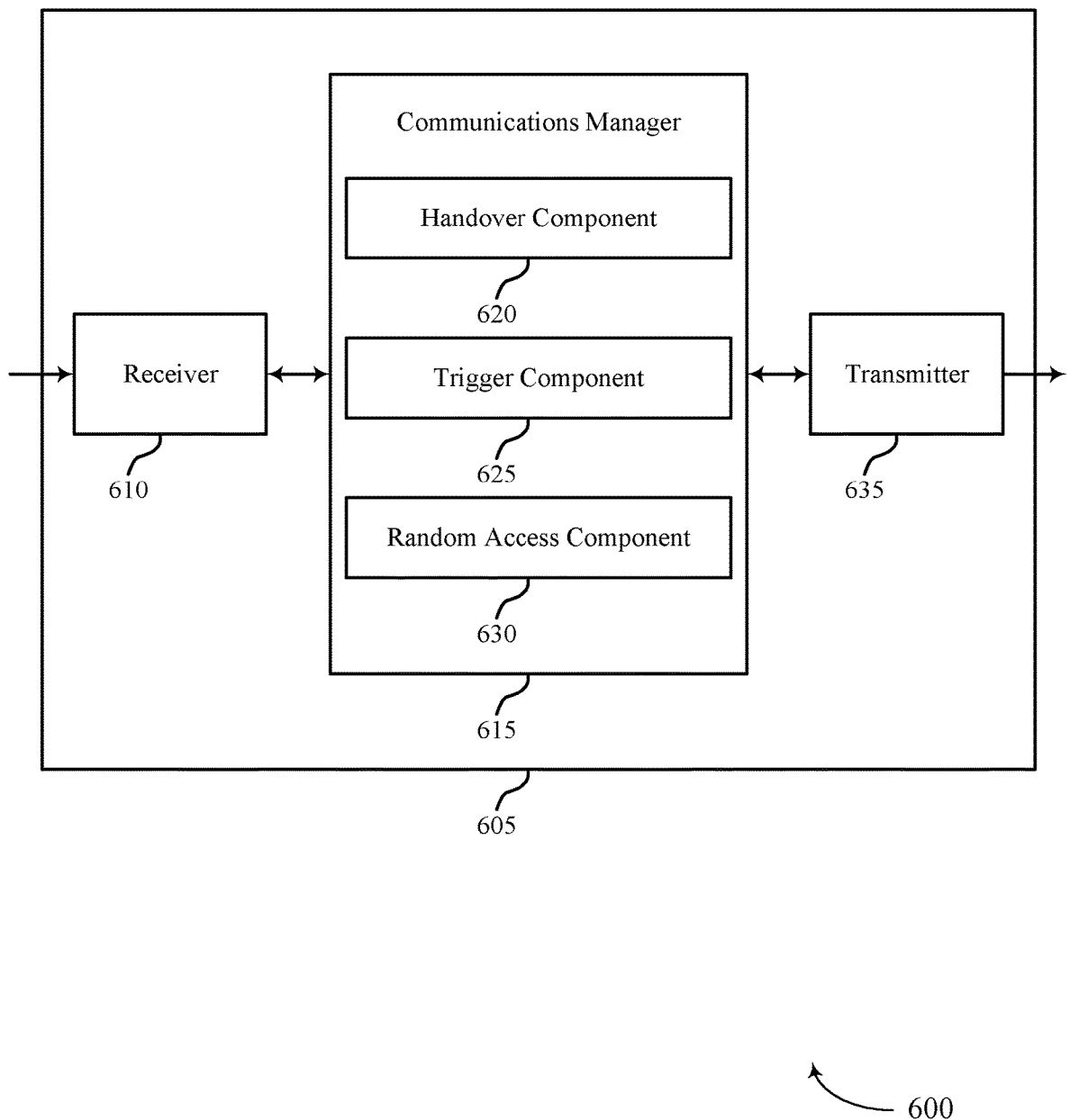

FIG. 6 shows a block diagram 600 of a device 605 that supports conditional handover for mobile networks in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to conditional handover for mobile networks, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a handover component 620, a trigger component 625, and a random access component 630. The communications manager 615 may be an example of aspects of the communications manager 810 described herein.

The handover component 620 may receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier.

The trigger component 625 may determine that a trigger condition of the set of trigger conditions is satisfied. The random access component 630 may transmit, to the relay node and based on the trigger condition being satisfied, a random access message to initiate the conditional handover procedure for the cell from the first cell identifier to the second cell identifier.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception over one or more bands.

The communications manager 615 as described herein may be implemented to realize one or more potential advantages. One implementation may allow to device 605 to save power and increase battery life by decreasing the time and number of transmissions to complete a handover. For example, the device 605 may initiate handover after receiving an indication of trigger conditions for a conditional handover procedure and determining that a trigger condition is satisfied. Another implementation may allow the device 605 to decrease latency for performing conditional handover in response to a PCI change.

Figure 7:
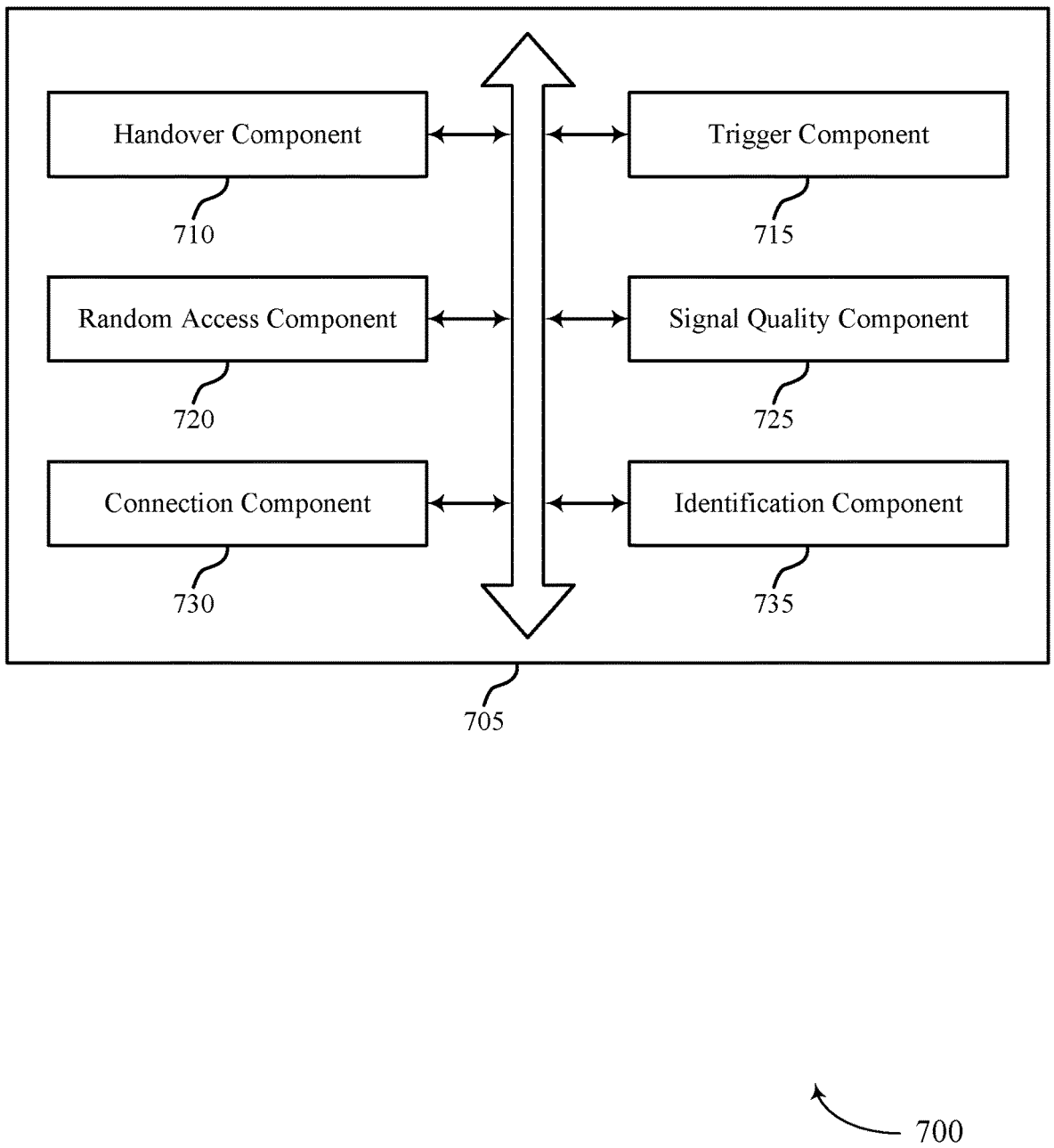
FIG. 7 shows a block diagram of a communications manager that supports conditional handover for mobile networks in accordance with aspects of the present disclosure.

FIG. 7 shows a block diagram 700 of a communications manager 705 that supports conditional handover for mobile networks in accordance with aspects of the present disclosure. The communications manager 705 may be an example of aspects of a communications manager 515, a communications manager 615, or a communications manager 810 described herein. The communications manager 705 may include a handover component 710, a trigger component 715, a random access component 720, a signal quality component 725, a connection component 730, and an identification component 735. Each of these modules may communicate, directly or indirectly, with one another (e.g., via one or more buses).

The handover component 710 may receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier.

In some examples, the handover component 710 may identify a time duration after receipt of the conditional handover configuration for the wireless node to initiate the conditional handover procedure based on the set of trigger conditions.

In some examples, the handover component 710 may receive the indication of the conditional handover configuration from the relay node or from a central node in an integrated access and backhaul system. In some examples, the handover component 710 may receive the indication of the conditional handover configuration in an RRC message. In some cases, the wireless node is a UE or a MT function of an integrated access and backhaul node.

The trigger component 715 may determine that a trigger condition of the set of trigger conditions is satisfied. In some examples, the trigger component 715 may determine that the trigger condition of the set of trigger conditions is satisfied based on determining that the time duration after receipt of the conditional handover configuration has elapsed.

In some examples, the trigger component 715 may determine that the trigger condition of the set of trigger conditions is satisfied based on the signal quality being below a threshold signal quality. In some examples, the trigger component 715 may determine that the trigger condition of the set of trigger conditions is satisfied based on the signal quality being above a threshold signal quality. In some examples, the trigger component 715 may determine that the trigger condition of the set of trigger conditions is satisfied based on a difference between the first signal quality and the second signal quality satisfying a relative signal quality threshold.

In some cases, the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof. In some cases, the time duration indicates a number of slots, a number of frames, a number of symbols, or a time period following receipt of the conditional handover configuration.

The random access component 720 may transmit, to the relay node and based on the trigger condition being satisfied, a random access message to initiate the conditional handover procedure for the cell from the first cell identifier to the second cell identifier.

The signal quality component 725 may measure a signal quality of a signal from the cell associated with the first cell identifier based on the set of trigger conditions. In some examples, the signal quality component 725 may measure a signal quality of a signal from the cell associated with the second cell identifier based on the set of trigger conditions. In some examples, the signal quality component 725 may measure a first signal quality of a first signal from the cell associated with the first cell identifier based on the set of trigger conditions.

In some examples, the signal quality component 725 may measure a second signal quality of a second signal from the cell associated with the second cell identifier based on the set of trigger conditions.

The connection component 730 may establish, as part of the conditional handover procedure, a connection with the relay node via the cell associated with the second cell identifier after a transition period of the cell from the first cell identifier to the second cell identifier. In some examples, the connection component 730 may establish, as part of the conditional handover procedure, a connection with the relay node via the cell associated with the second cell identifier after transmitting the random access message.

The identification component 735 may receive, from the relay node and during the transition period, one or more signals associated with the first cell identifier and one or more signals associated with the second cell identifier.

Figure 8:
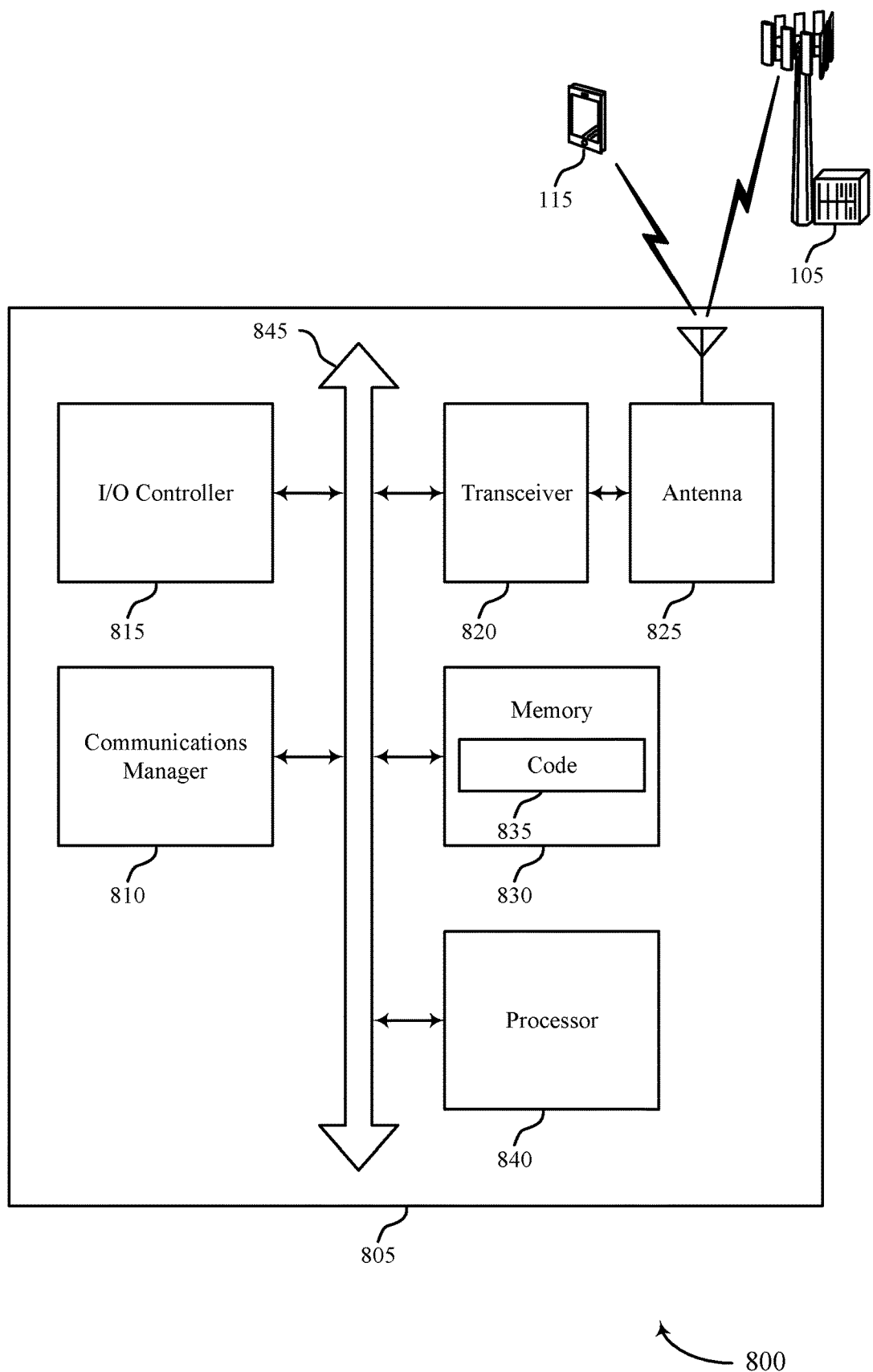
FIG. 8 shows a diagram of a system including a device that supports conditional handover for mobile networks in accordance with aspects of the present disclosure.

FIG. 8 shows a diagram of a system 800 including a device 805 that supports conditional handover for mobile networks in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier, determine that a trigger condition of the set of trigger conditions is satisfied, and transmit, to the relay node and based on the trigger condition being satisfied, a random access message to initiate the conditional handover procedure for the cell from the first cell identifier to the second cell identifier.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, a FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting conditional handover for mobile networks).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 of the UE 115 may efficiently determine when to transmit a random access message in response for conditional handover configuration messaging received from a base station 105 (e.g., an IAB node 215). The processor may determine when specific trigger conditions are satisfied in response to receiving the conditional handover configuration, and may transmit the random access message to initiate the handover process. This may avoid latency when the PCI of the serving cell changes, and therefore may increase efficiency of the processor and increase battery life. The PCI of the serving cell may change in order to avoid interference when a nearby cell has the same PCI.

Figure 9:
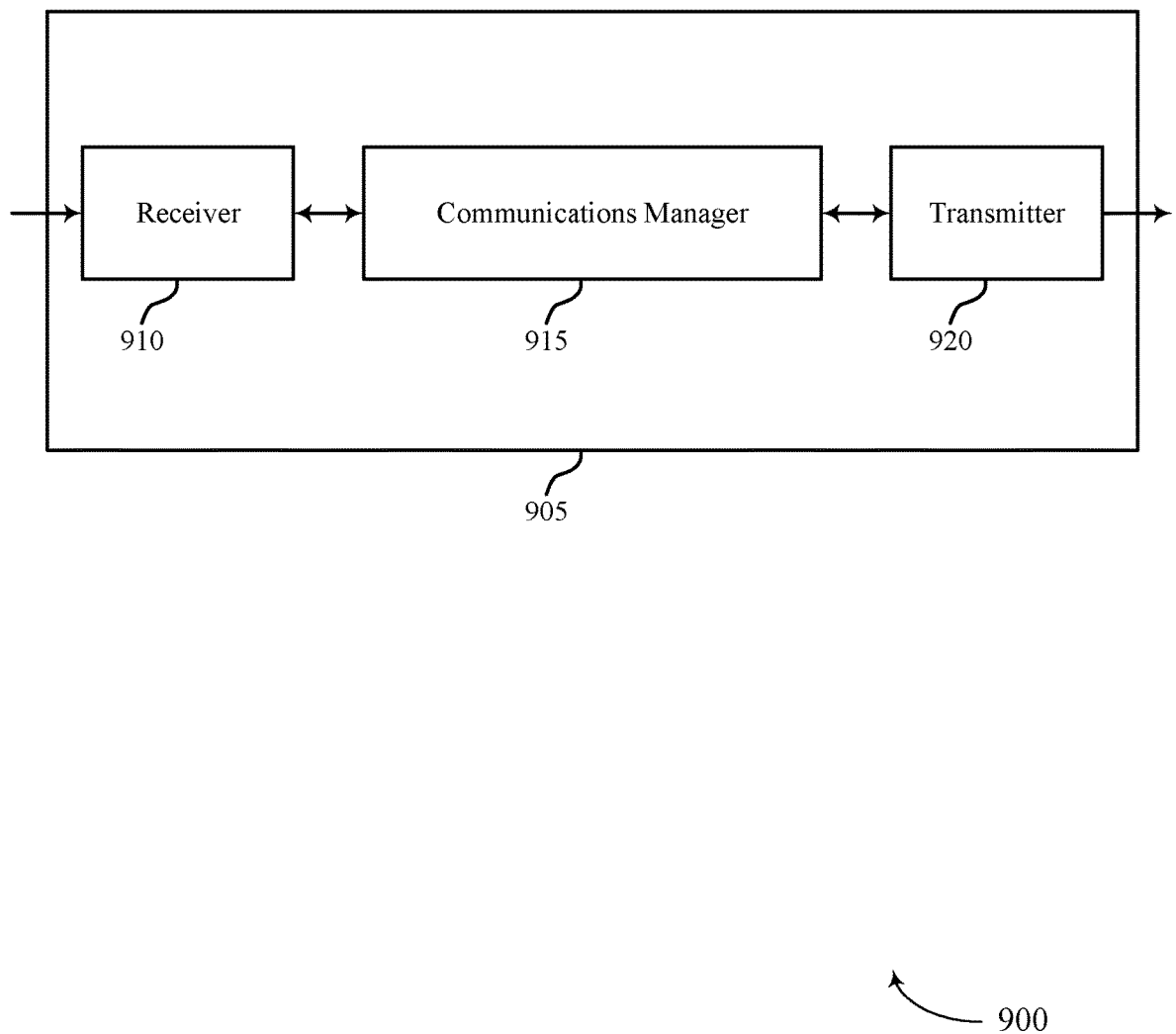
FIGS. 9 and 10 show block diagrams of devices that support conditional handover for mobile networks in accordance with aspects of the present disclosure.

FIG. 9 shows a block diagram 900 of a device 905 that supports conditional handover for mobile networks in accordance with aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to conditional handover for mobile networks, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

The communications manager 915 may establish a connection with a wireless node via a cell supported by the relay node, the cell associated with a first cell identifier, determine, based on a neighboring cell being associated with the first cell identifier, a change of the cell from the first cell identifier to a second cell identifier, and transmit an indication of a conditional handover configuration that specifies a set of trigger conditions for a conditional handover procedure based on determining the change of the cell from the first cell identifier to the second cell identifier. The communications manager 915 may also identify a first cell identifier of a cell supported by a relay node in communication with a wireless node and the central node, determine to change the cell from the first cell identifier to a second cell identifier based on a neighboring cell of the relay node being associated with the first cell identifier, and transmit, to the relay node and based on determining, an indication to change the cell from the first cell identifier to the second cell identifier. The communications manager 915 may be an example of aspects of the communications manager 1210 or 1310 as described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 920 may transmit signals generated by other components of the device 905. In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize a single antenna or a set of antennas.

Figure 10:
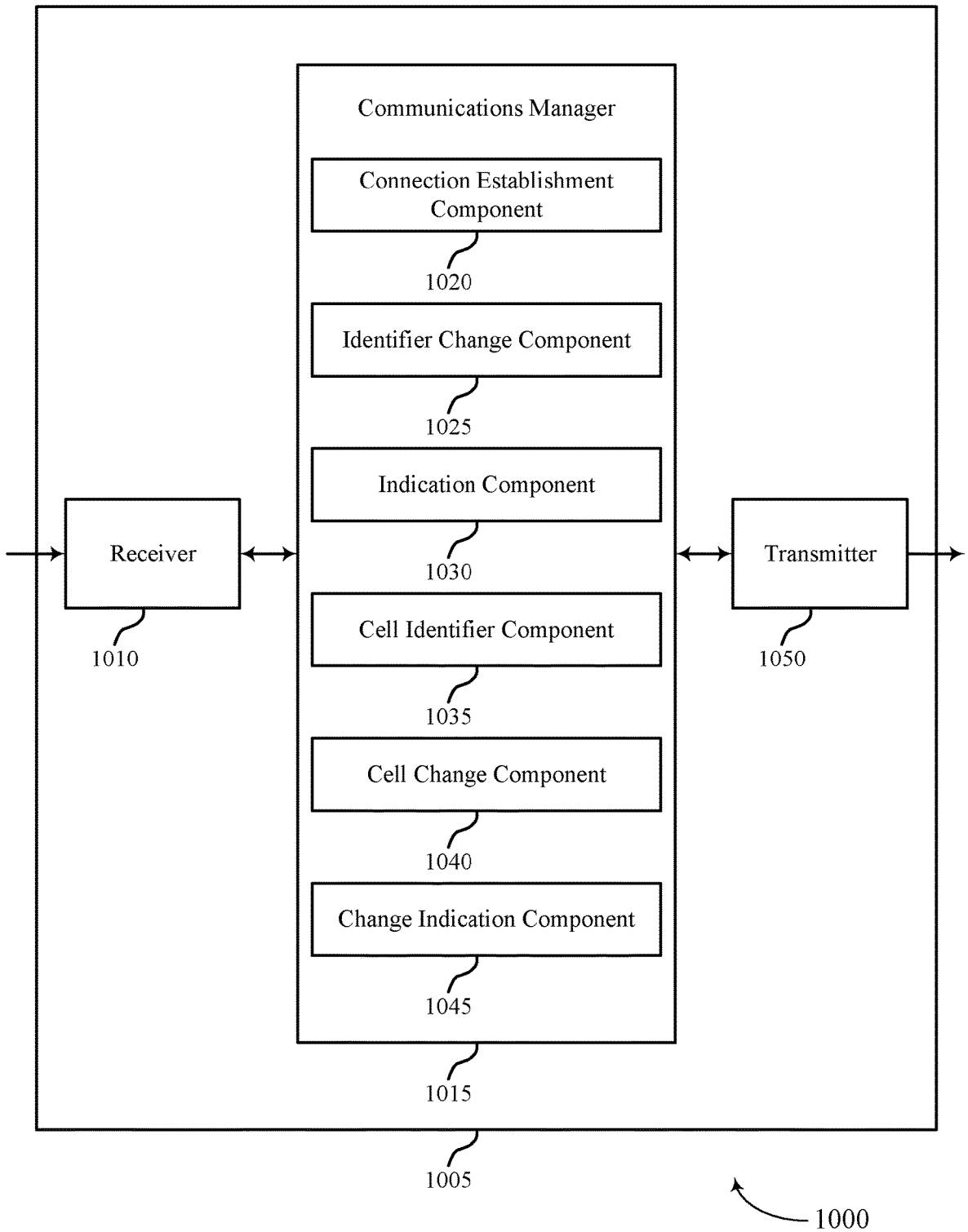

FIG. 10 shows a block diagram 1000 of a device 1005 that supports conditional handover for mobile networks in accordance with aspects of the present disclosure. The device 1005 may be an example of aspects of a device 905, a UE 115, or a base station 105 as described herein. The device 1005 may include a receiver 1010, a communications manager 1015, and a transmitter 1050. The device 1005 may also include a processor. Each of these components may be in communication with one another (e.g., via one or more buses).

Receiver 1010 may receive information such as packets, user data, or control information associated with various information channels (e.g., control channels, data channels, and information related to conditional handover for mobile networks, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a connection establishment component 1020, an identifier change component 1025, an indication component 1030, a cell identifier component 1035, a cell change component 1040, and a change indication component 1045. The communications manager 1015 may be an example of aspects of the communications manager 1210 or 1310 as described herein.

The connection establishment component 1020 may establish a connection with a wireless node via a cell supported by the relay node, the cell associated with a first cell identifier.

The identifier change component 1025 may determine, based on a neighboring cell being associated with the first cell identifier, a change of the cell from the first cell identifier to a second cell identifier.

The indication component 1030 may transmit an indication of a conditional handover configuration that specifies a set of trigger conditions for a conditional handover procedure based on determining the change of the cell from the first cell identifier to the second cell identifier.

The cell identifier component 1035 may identify a first cell identifier of a cell supported by a relay node in communication with a wireless node and the central node. The cell change component 1040 may determine to change the cell from the first cell identifier to a second cell identifier based on a neighboring cell of the relay node being associated with the first cell identifier. The change indication component 1045 may transmit, to the relay node and based on determining, an indication to change the cell from the first cell identifier to the second cell identifier.

Transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 or 1320 as described with reference to FIGS. 12 and 13. The transmitter 1050 may utilize a single antenna or a set of antennas.

Figure 11:
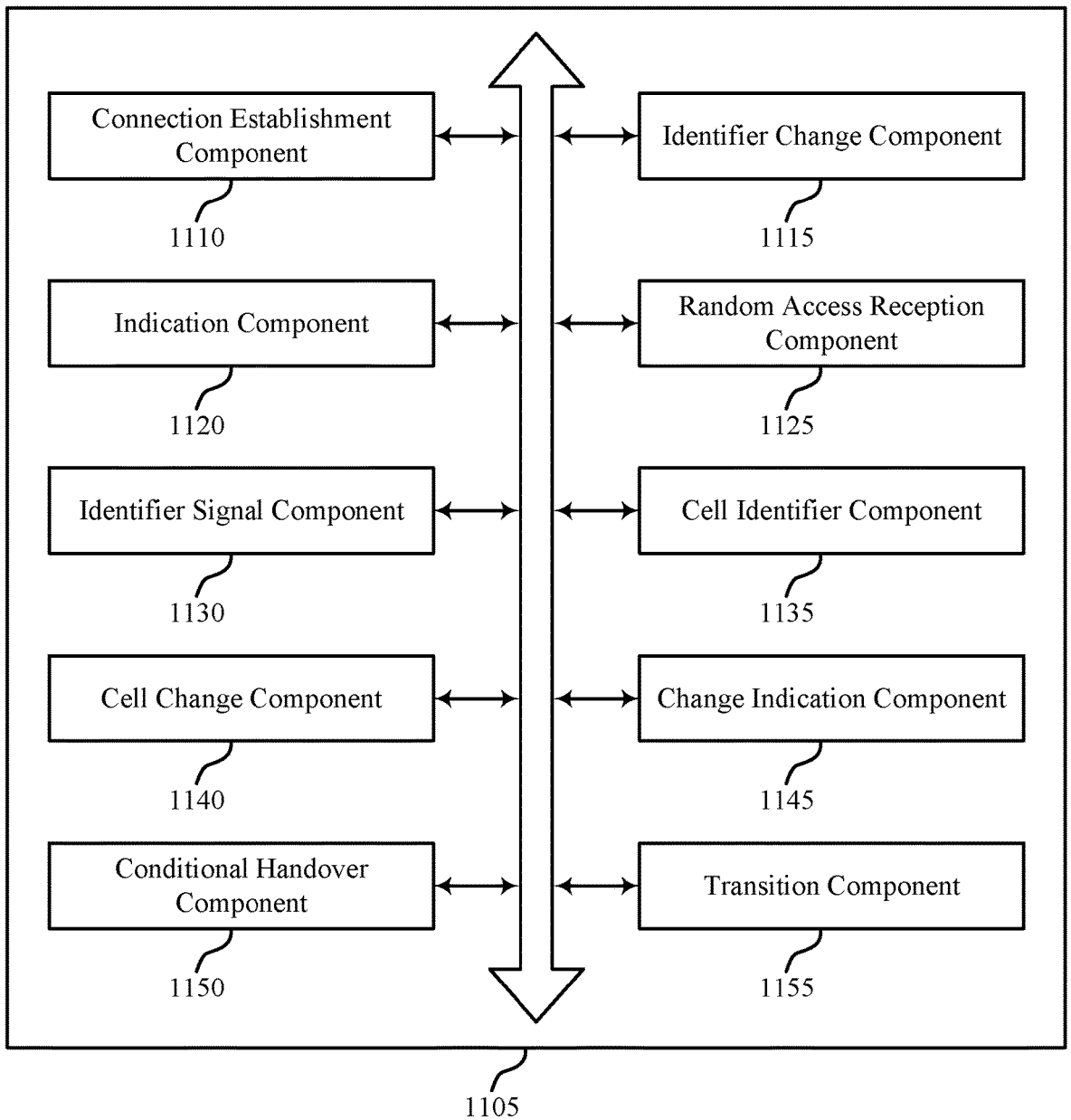
FIG. 11 shows a block diagram of a communications manager that supports conditional handover for mobile networks in accordance with aspects of the present disclosure.

FIG. 11 shows a block diagram 1100 of a communications manager 1105 that supports conditional handover for mobile networks in accordance with aspects of the present disclosure. The communications manager 1105 may be an example of aspects of a communications manager 915, a communications manager 1015, or a communications manager 1210 described herein. The communications manager 1105 may include a connection establishment component 1110, an identifier change component 1115, an indication component 1120, a random access reception component 1125, an identifier signal component 1130, a cell identifier component 1135, a cell change component 1140, a change indication component 1145, a conditional handover component 1150, and a transition component 1155. Each of these modules may communicate, directly or indirectly, with one another (e.g., via one or more buses).

The connection establishment component 1110 may establish a connection with a wireless node via a cell supported by the relay node, the cell associated with a first cell identifier.

In some examples, the connection establishment component 1110 may establish, after receiving the random access message, a second connection with the wireless node via the cell associated with the second cell identifier as part of the conditional handover procedure.

In some cases, the wireless node is a UE or a MT function of an integrated access and backhaul node. In some cases, the relay node is an integrated access and backhaul node.

The identifier change component 1115 may determine, based on a neighboring cell being associated with the first cell identifier, a change of the cell from the first cell identifier to a second cell identifier.

The indication component 1120 may transmit an indication of a conditional handover configuration that specifies a set of trigger conditions for a conditional handover procedure based on determining the change of the cell from the first cell identifier to the second cell identifier.

In some examples, the indication component 1120 may receive, from a central node in communication with the relay node, an indication to change the cell from the first cell identifier to the second cell identifier, where determining the change of the cell from the first cell identifier to the second cell identifier based on the indication received from the central node.

In some examples, the indication component 1120 may receive, from a central node in communication with the relay node, the indication of the conditional handover configuration. In some examples, the indication component 1120 may transmit the indication of the conditional handover configuration via an RRC message.

In some cases, the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof.

The cell identifier component 1135 may identify a first cell identifier of a cell supported by a relay node in communication with a wireless node and the central node.

In some cases, the wireless node is a UE or a MT function of an integrated access and backhaul node.

The cell change component 1140 may determine to change the cell from the first cell identifier to a second cell identifier based on a neighboring cell of the relay node being associated with the first cell identifier.

In some examples, the cell change component 1140 may receive, from a central entity, a signal that indicates the change of the cell from the first cell identifier to the second cell identifier.

The change indication component 1145 may transmit, to the relay node and based on determining, an indication to change the cell from the first cell identifier to the second cell identifier.

In some examples, the change indication component 1145 may transmit the indication to change the cell from the first cell identifier to the second cell identifier via an application protocol interface.

The random access reception component 1125 may receive, from the wireless node, a random access message as part of the conditional handover procedure, the random access message received based on a trigger condition of the set of trigger conditions being satisfied.

The identifier signal component 1130 may transmit, during a transition period after transmitting the indication of the conditional handover configuration, one or more signals associated with the first cell identifier.

In some examples, the identifier signal component 1130 may transmit, during the transition period after transmitting the indication of the conditional handover configuration, one or more signals associated with the second cell identifier. In some examples, the identifier signal component 1130 may transmit one or more signals associated with the second cell identifier after transmitting the indication of the conditional handover configuration.

The conditional handover component 1150 may transmit a conditional handover configuration to the wireless node based on the determining, where the conditional handover configuration includes one or more parameters of a conditional handover procedure to change the cell from the first cell identifier to the second cell identifier. In some examples, the conditional handover component 1150 may transmit the conditional handover configuration via RRC signaling.

In some cases, the conditional handover configuration includes a set of trigger conditions for the conditional handover procedure, where the set of trigger conditions includes a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first and second cell identifiers, or any combination thereof.

The transition component 1155 may transmit, to the relay node, an indication of a transition period for changing the cell from the first cell identifier to the second cell identifier.

In some cases, the transition period indicates a time period in which the relay node performs communications associated with both the first and second cell identifiers.

Figure 12:
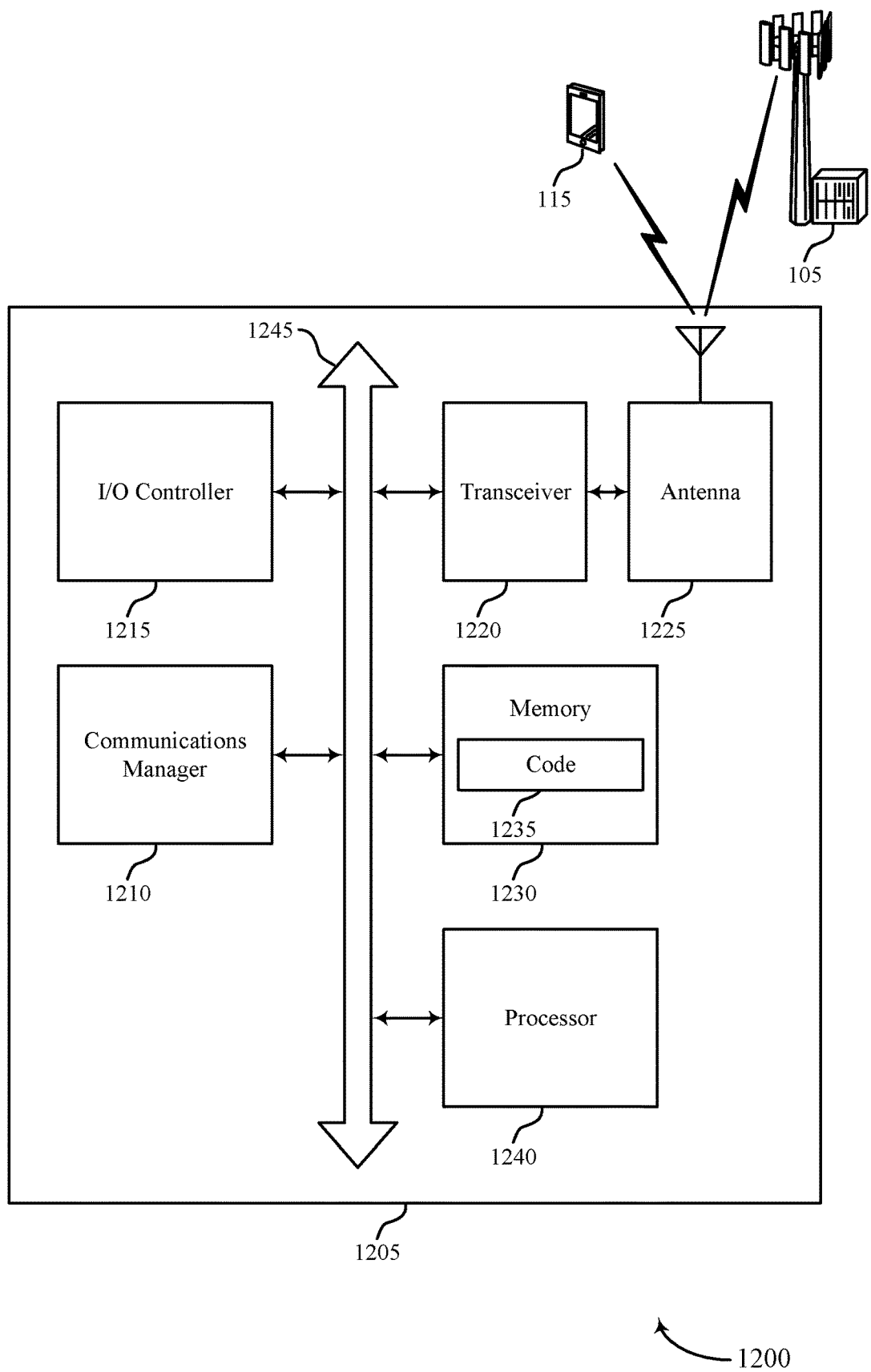
FIG. 12 shows a diagram of a system including a user equipment (UE) that supports conditional handover for mobile networks in accordance with aspects of the present disclosure.

FIG. 12 shows a diagram of a system 1200 including a device 1205 that supports conditional handover for mobile networks in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, a transceiver 1220, an antenna 1225, memory 1230, a processor 1240, and an I/O controller 1215. These components may be in electronic communication via one or more buses (e.g., bus 1245).

The communications manager 1210 may establish a connection with a wireless node via a cell supported by the relay node, the cell associated with a first cell identifier, determine, based on a neighboring cell being associated with the first cell identifier, a change of the cell from the first cell identifier to a second cell identifier, and transmit an indication of a conditional handover configuration that specifies a set of trigger conditions for a conditional handover procedure based on determining the change of the cell from the first cell identifier to the second cell identifier.

The communications manager 1210 may also identify a first cell identifier of a cell supported by a relay node in communication with a wireless node and the central node, determine to change the cell from the first cell identifier to a second cell identifier based on a neighboring cell of the relay node being associated with the first cell identifier, and transmit, to the relay node and based on determining, an indication to change the cell from the first cell identifier to the second cell identifier.

Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the device 1205 may include a single antenna 1225, or may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting conditional handover for mobile networks).

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
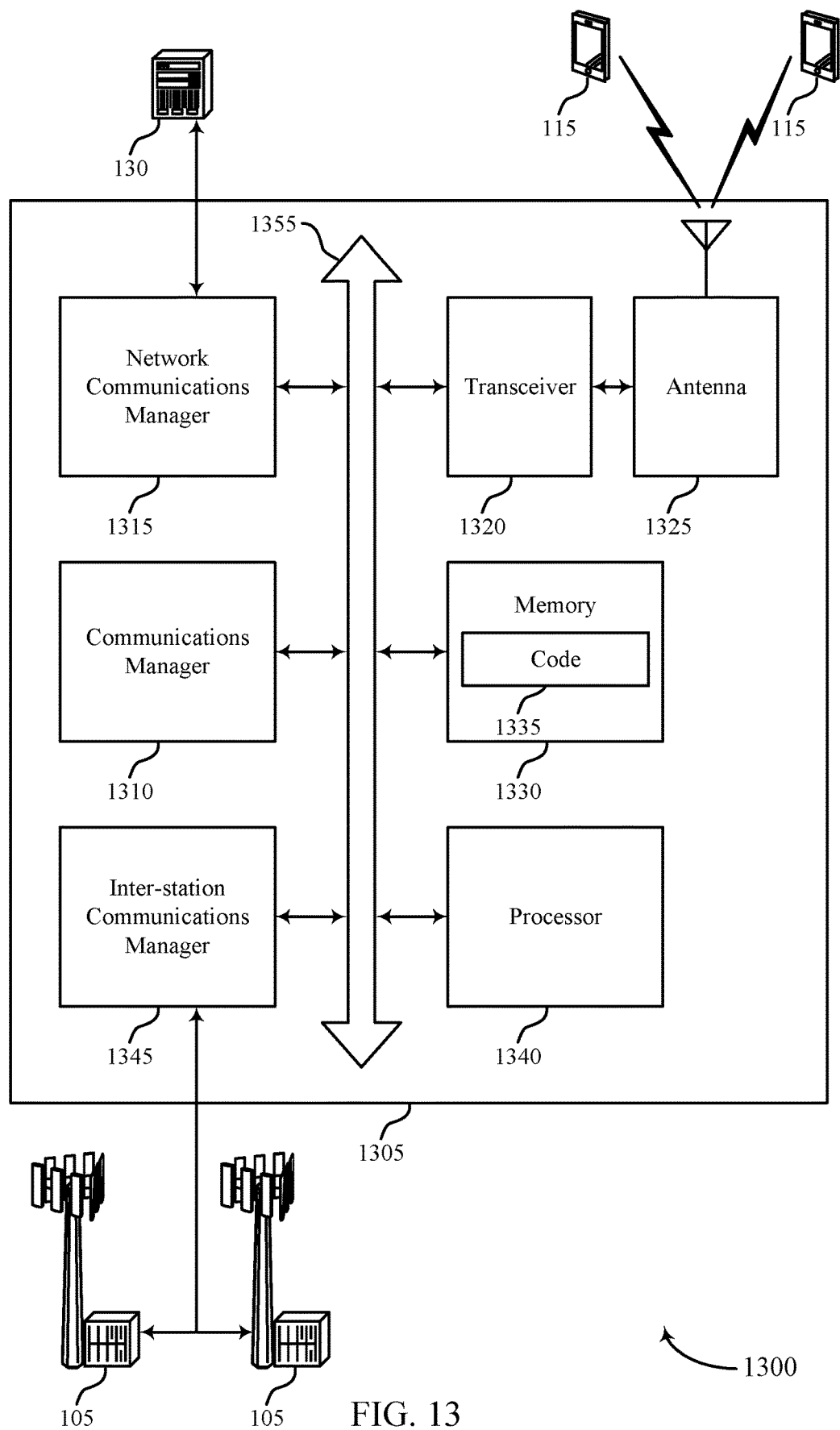
FIG. 13 shows a diagram of a system including a base station that supports conditional handover for mobile networks in accordance with aspects of the present disclosure.

FIG. 13 shows a diagram of a system 1300 including a device 1305 that supports conditional handover for mobile networks in accordance with aspects of the present disclosure. The device 1305 may be an example of or include the components of device 905, device 1005, or a base station 105 as described herein. The device 1305 may include components for bi-directional voice and data communications including components for transmitting and receiving communications, including a communications manager 1310, a network communications manager 1350, a transceiver 1320, an antenna 1325, memory 1330, a processor 1340, and an inter-station communications manager 1355. These components may be in electronic communication via one or more buses (e.g., bus 1345).

The communications manager 1310 may establish a connection with a wireless node via a cell supported by the relay node, the cell associated with a first cell identifier, determine, based on a neighboring cell being associated with the first cell identifier, a change of the cell from the first cell identifier to a second cell identifier, and transmit an indication of a conditional handover configuration that specifies a set of trigger conditions for a conditional handover procedure based on determining the change of the cell from the first cell identifier to the second cell identifier.

The communications manager 1310 may also identify a first cell identifier of a cell supported by a relay node in communication with a wireless node and the central node, determine to change the cell from the first cell identifier to a second cell identifier based on a neighboring cell of the relay node being associated with the first cell identifier, and transmit, to the relay node and based on determining, an indication to change the cell from the first cell identifier to the second cell identifier.

Network communications manager 1350 may manage communications with the core network (e.g., via one or more wired backhaul links). For example, the network communications manager 1350 may manage the transfer of data communications for client devices, such as one or more UEs 115.

Transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting conditional handover for mobile networks).

Inter-station communications manager 1355 may manage communications with other base station 105, and may include a controller or scheduler for controlling communications with UEs 115 in cooperation with other base stations 105. For example, the inter-station communications manager 1355 may coordinate scheduling for transmissions to UEs 115 for various interference mitigation techniques such as beamforming or joint transmission. In some examples, inter-station communications manager 1355 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
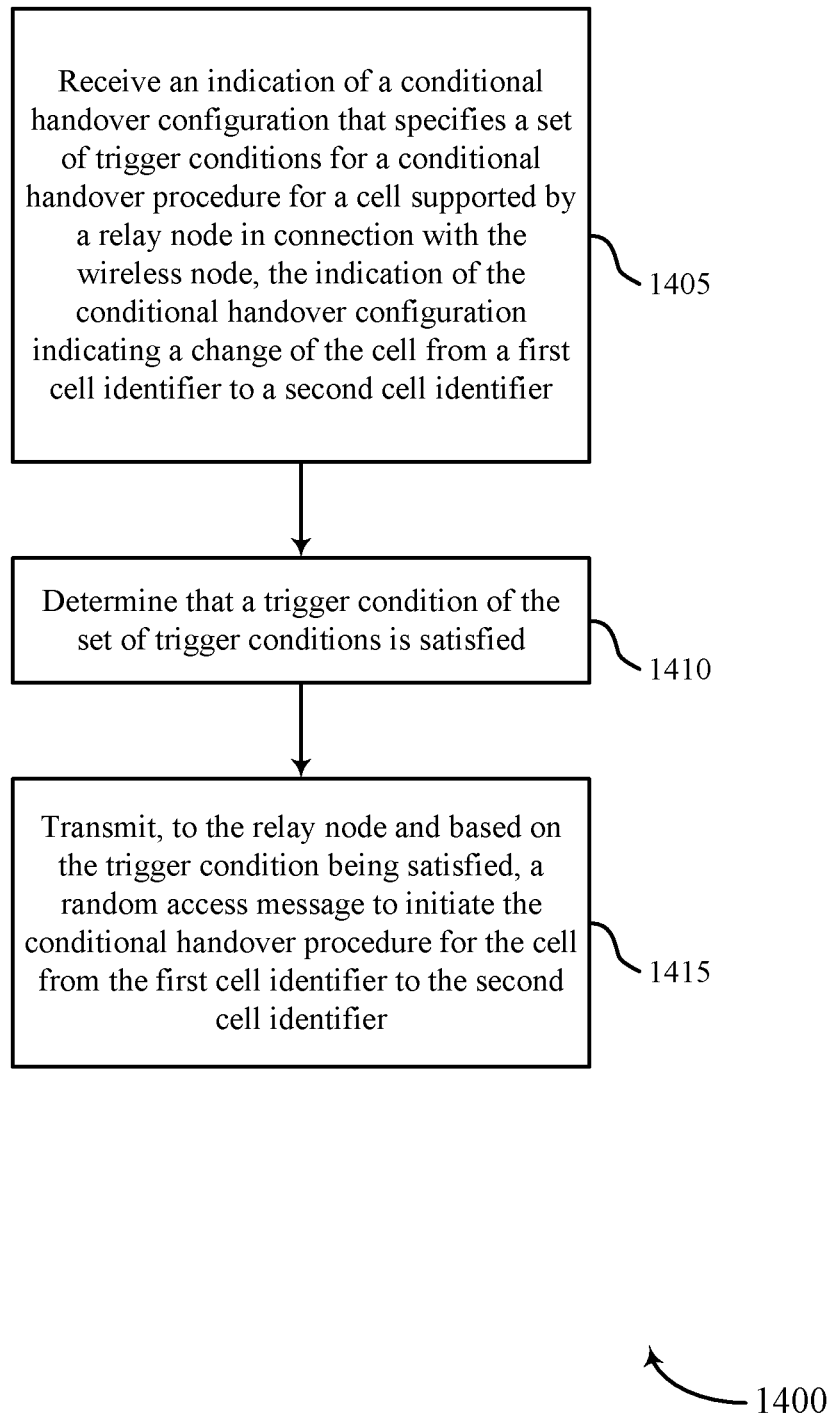
FIGS. 14 through 18 show flowcharts illustrating methods that support conditional handover for mobile networks in accordance with aspects of the present disclosure.

FIG. 14 shows a flowchart illustrating a method 1400 that supports conditional handover for mobile networks in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier. The operations of 1405 may be performed according to the methods described herein. In some examples, aspects of the operations of 1405 may be performed by a handover component as described with reference to FIGS. 5 through 8.

At 1410, the UE may determine that a trigger condition of the set of trigger conditions is satisfied. The operations of 1410 may be performed according to the methods described herein. In some examples, aspects of the operations of 1410 may be performed by a trigger component as described with reference to FIGS. 5 through 8.

At 1415, the UE may transmit, to the relay node and based on the trigger condition being satisfied, a random access message to initiate the conditional handover procedure for the cell from the first cell identifier to the second cell identifier. The operations of 1415 may be performed according to the methods described herein. In some examples, aspects of the operations of 1415 may be performed by a random access component as described with reference to FIGS. 5 through 8.

Figure 15:
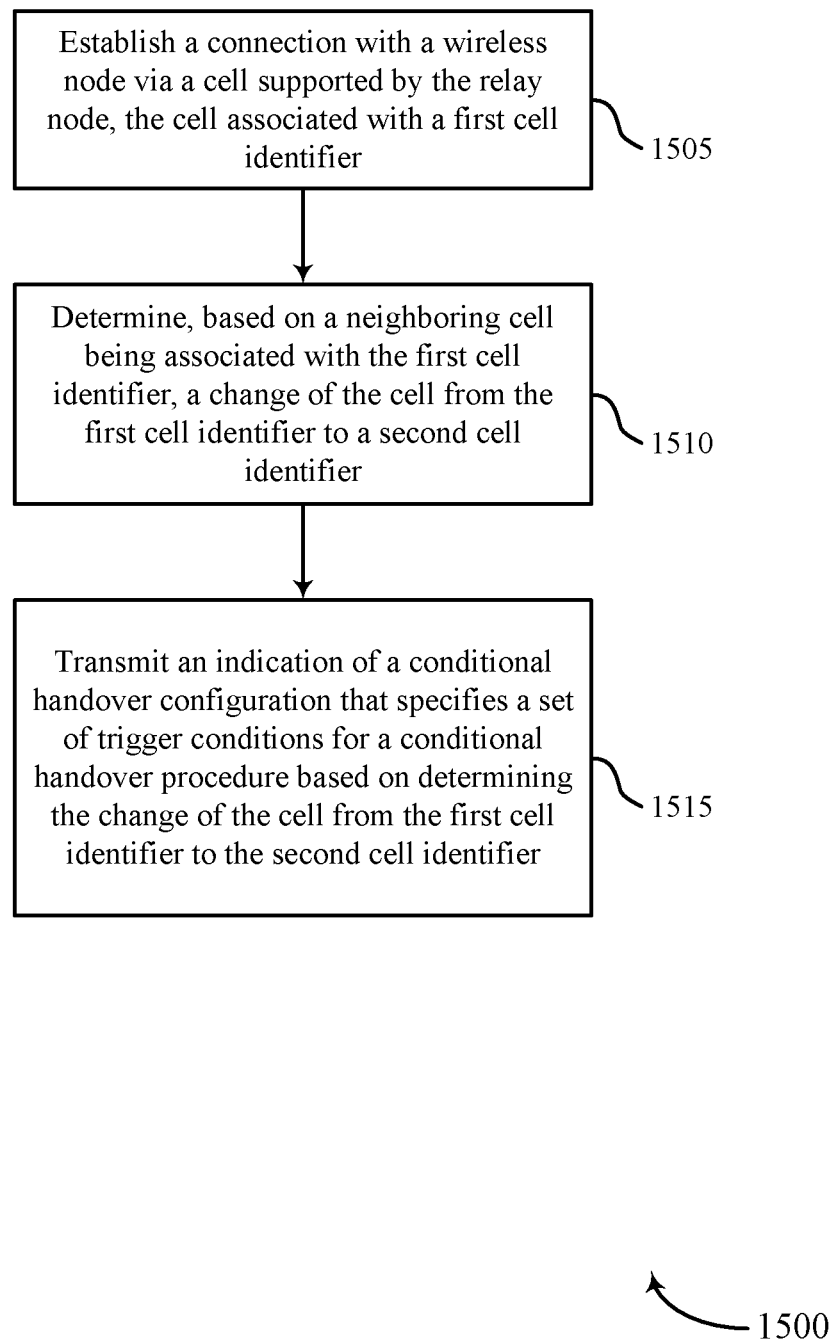

FIG. 15 shows a flowchart illustrating a method 1500 that supports conditional handover for mobile networks in accordance with aspects of the present disclosure. The operations of method 1500 may be implemented by a UE 115 or base station 105 or its components as described herein. For example, the operations of method 1500 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may establish a connection with a wireless node via a cell supported by the relay node, the cell associated with a first cell identifier. The operations of 1505 may be performed according to the methods described herein. In some examples, aspects of the operations of 1505 may be performed by a connection establishment component as described with reference to FIGS. 9 through 13.

At 1510, the UE or base station may determine, based on a neighboring cell being associated with the first cell identifier, a change of the cell from the first cell identifier to a second cell identifier. The operations of 1510 may be performed according to the methods described herein. In some examples, aspects of the operations of 1510 may be performed by an identifier change component as described with reference to FIGS. 9 through 13.

At 1515, the UE or base station may transmit an indication of a conditional handover configuration that specifies a set of trigger conditions for a conditional handover procedure based on determining the change of the cell from the first cell identifier to the second cell identifier. The operations of 1515 may be performed according to the methods described herein. In some examples, aspects of the operations of 1515 may be performed by an indication component as described with reference to FIGS. 9 through 13.

Figure 16:
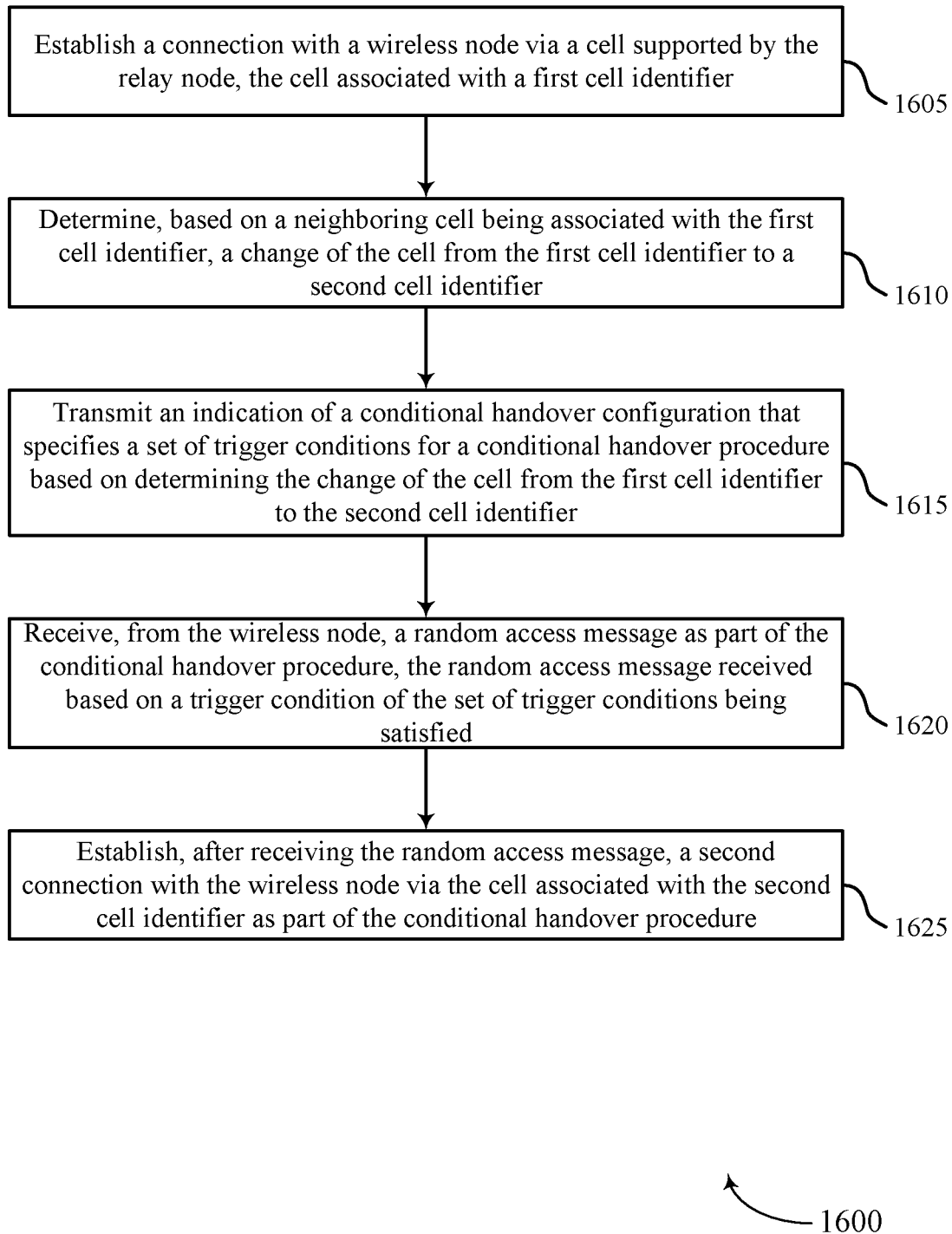

FIG. 16 shows a flowchart illustrating a method 1600 that supports conditional handover for mobile networks in accordance with aspects of the present disclosure. The operations of method 1600 may be implemented by a UE 115 or base station 105 or its components as described herein. For example, the operations of method 1600 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may establish a connection with a wireless node via a cell supported by the relay node, the cell associated with a first cell identifier. The operations of 1605 may be performed according to the methods described herein. In some examples, aspects of the operations of 1605 may be performed by a connection establishment component as described with reference to FIGS. 9 through 13.

At 1610, the UE or base station may determine, based on a neighboring cell being associated with the first cell identifier, a change of the cell from the first cell identifier to a second cell identifier. The operations of 1610 may be performed according to the methods described herein. In some examples, aspects of the operations of 1610 may be performed by an identifier change component as described with reference to FIGS. 9 through 13.

At 1615, the UE or base station may transmit an indication of a conditional handover configuration that specifies a set of trigger conditions for a conditional handover procedure based on determining the change of the cell from the first cell identifier to the second cell identifier. The operations of 1615 may be performed according to the methods described herein. In some examples, aspects of the operations of 1615 may be performed by an indication component as described with reference to FIGS. 9 through 13.

At 1620, the UE or base station may receive, from the wireless node, a random access message as part of the conditional handover procedure, the random access message received based on a trigger condition of the set of trigger conditions being satisfied. The operations of 1620 may be performed according to the methods described herein. In some examples, aspects of the operations of 1620 may be performed by a random access reception component as described with reference to FIGS. 9 through 13.

At 1625, the UE or base station may establish, after receiving the random access message, a second connection with the wireless node via the cell associated with the second cell identifier as part of the conditional handover procedure. The operations of 1625 may be performed according to the methods described herein. In some examples, aspects of the operations of 1625 may be performed by a connection establishment component as described with reference to FIGS. 9 through 13.

Figure 17:
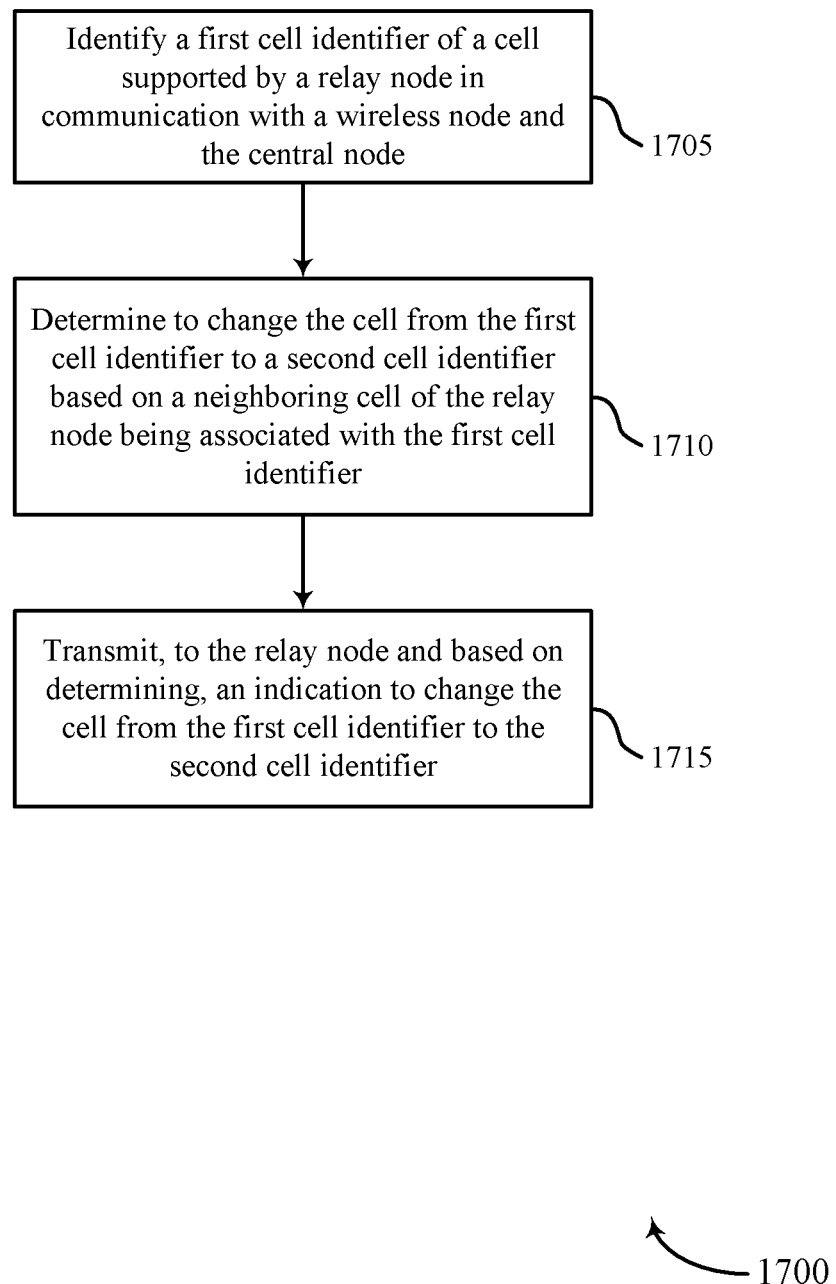

FIG. 17 shows a flowchart illustrating a method 1700 that supports conditional handover for mobile networks in accordance with aspects of the present disclosure. The operations of method 1700 may be implemented by a UE 115 or base station 105 or its components as described herein. For example, the operations of method 1700 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may identify a first cell identifier of a cell supported by a relay node in communication with a wireless node and the central node. The operations of 1705 may be performed according to the methods described herein. In some examples, aspects of the operations of 1705 may be performed by a cell identifier component as described with reference to FIGS. 9 through 13.

At 1710, the UE or base station may determine to change the cell from the first cell identifier to a second cell identifier based on a neighboring cell of the relay node being associated with the first cell identifier. The operations of 1710 may be performed according to the methods described herein. In some examples, aspects of the operations of 1710 may be performed by a cell change component as described with reference to FIGS. 9 through 13.

At 1715, the UE or base station may transmit, to the relay node and based on determining, an indication to change the cell from the first cell identifier to the second cell identifier. The operations of 1715 may be performed according to the methods described herein. In some examples, aspects of the operations of 1715 may be performed by a change indication component as described with reference to FIGS. 9 through 13.

Figure 18:
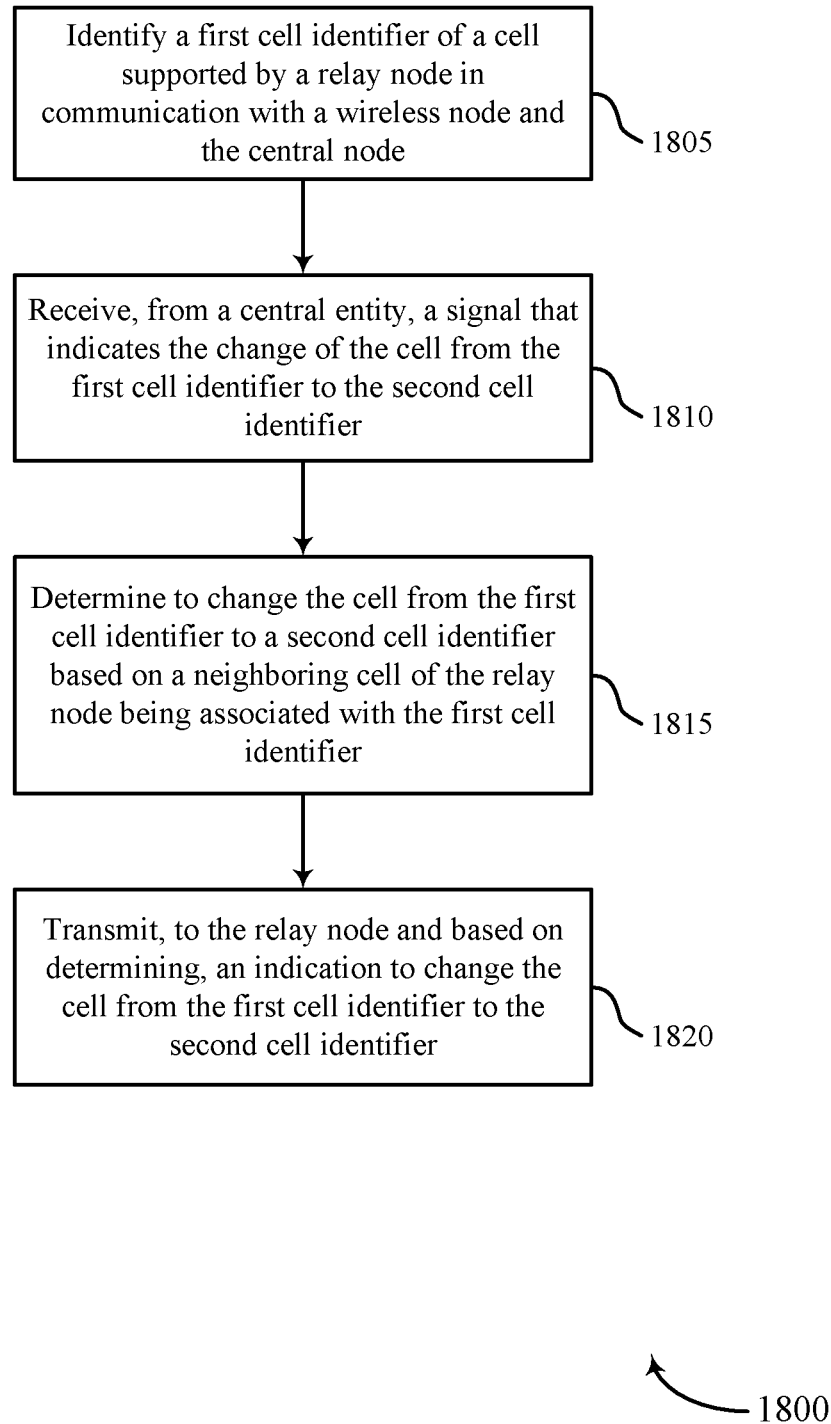

FIG. 18 shows a flowchart illustrating a method 1800 that supports conditional handover for mobile networks in accordance with aspects of the present disclosure. The operations of method 1800 may be implemented by a UE 115 or base station 105 or its components as described herein. For example, the operations of method 1800 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1805, the UE or base station may identify a first cell identifier of a cell supported by a relay node in communication with a wireless node and the central node. The operations of 1805 may be performed according to the methods described herein. In some examples, aspects of the operations of 1805 may be performed by a cell identifier component as described with reference to FIGS. 9 through 13.

At 1810, the UE or base station may receive, from a central entity, a signal that indicates the change of the cell from the first cell identifier to the second cell identifier. The operations of 1810 may be performed according to the methods described herein. In some examples, aspects of the operations of 1810 may be performed by a cell change component as described with reference to FIGS. 9 through 13.

At 1815, the UE or base station may determine to change the cell from the first cell identifier to a second cell identifier based on a neighboring cell of the relay node being associated with the first cell identifier. The operations of 1815 may be performed according to the methods described herein. In some examples, aspects of the operations of 1815 may be performed by a cell change component as described with reference to FIGS. 9 through 13.

At 1820, the UE or base station may transmit, to the relay node and based on determining, an indication to change the cell from the first cell identifier to the second cell identifier. The operations of 1820 may be performed according to the methods described herein. In some examples, aspects of the operations of 1820 may be performed by a change indication component as described with reference to FIGS. 9 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless node, comprising:
    receiving an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier; and
    transmitting, to the relay node and based at least in part on a trigger condition of the set of trigger conditions being satisfied, a random access message to initiate the conditional handover procedure for the cell from the first cell identifier to the second cell identifier.

2. The method of claim 1, further comprising:
    identifying a time duration after receipt of the conditional handover configuration for the wireless node to initiate the conditional handover procedure based at least in part on the set of trigger conditions; and
    determining that the trigger condition of the set of trigger conditions is satisfied based at least in part on determining that the time duration after receipt of the conditional handover configuration has elapsed.

3. The method of claim 1, further comprising:
    measuring a signal quality of a signal from the cell associated with the first cell identifier based at least in part on the set of trigger conditions; and
    determining that the trigger condition of the set of trigger conditions is satisfied based at least in part on the signal quality being below a threshold signal quality.

4. The method of claim 1, further comprising:
    measuring a signal quality of a signal from the cell associated with the second cell identifier based at least in part on the set of trigger conditions; and
    determining that the trigger condition of the set of trigger conditions is satisfied based at least in part on the signal quality being above a threshold signal quality.

5. The method of claim 1, further comprising:
    measuring a first signal quality of a first signal from the cell associated with the first cell identifier based at least in part on the set of trigger conditions;
    measuring a second signal quality of a second signal from the cell associated with the second cell identifier based at least in part on the set of trigger conditions; and
    determining that the trigger condition of the set of trigger conditions is satisfied based at least in part on a difference between the first signal quality and the second signal quality satisfying a relative signal quality threshold.

6. The method of claim 1, further comprising:
    receiving the indication of the conditional handover configuration from the relay node or from a central node in an integrated access and backhaul system.

7. The method of claim 1, further comprising:
receiving the indication of the conditional handover configuration in a radio resource control (RRC) message.

8. The method of claim 1, further comprising:
establishing, as part of the conditional handover procedure, a connection with the relay node via the cell associated with the second cell identifier after a transition period of the cell from the first cell identifier to the second cell identifier.

9. The method of claim 8, further comprising:
receiving, from the relay node and during the transition period, one or more signals associated with the first cell identifier and one or more signals associated with the second cell identifier.

10. The method of claim 1, further comprising:
establishing, as part of the conditional handover procedure, a connection with the relay node via the cell associated with the second cell identifier after transmitting the random access message.

11. The method of claim 1, wherein the set of trigger conditions comprises a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first cell identifier and the second cell identifier, or any combination thereof.

12. The method of claim 11, wherein the time duration indicates a number of slots, a number of frames, a number of symbols, or a time period following receipt of the conditional handover configuration.

13. The method of claim 1, wherein the wireless node is a user equipment (UE) or a mobile termination function of an integrated access and backhaul node.

14. A method for wireless communications at a relay node, comprising:
establishing a connection with a wireless node via a cell supported by the relay node, the cell associated with a first cell identifier;
and
transmitting, based at least in part on a change of the cell from the first cell identifier to a second cell identifier, an indication of a conditional handover configuration that specifies a set of trigger conditions for a conditional handover procedure, the change of the cell from the first cell identifier to the second cell identifier based at least in part on a neighboring cell being associated with the first cell identifier.

15. The method of claim 14, further comprising:
receiving, from the wireless node, a random access message as part of the conditional handover procedure, the random access message received based at least in part on a trigger condition of the set of trigger conditions being satisfied; and
establishing, after receiving the random access message, a second connection with the wireless node via the cell associated with the second cell identifier as part of the conditional handover procedure.

16. The method of claim 14, further comprising:
receiving, from a central node in communication with the relay node, an indication to change the cell from the first cell identifier to the second cell identifier, wherein the change of the cell from the first cell identifier to the second cell identifier is based at least in part on the indication to change the cell from the first cell identifier to the second cell identifier.

17. The method of claim 14, further comprising:
receiving, from a central node in communication with the relay node, the indication of the conditional handover configuration.

18. The method of claim 14, further comprising:
transmitting the indication of the conditional handover configuration via a radio resource control (RRC) message.

19. The method of claim 14, further comprising:
transmitting, during a transition period after transmitting the indication of the conditional handover configuration, one or more signals associated with the first cell identifier.

20. The method of claim 19, further comprising:
transmitting, during the transition period after transmitting the indication of the conditional handover configuration, one or more signals associated with the second cell identifier.

21. The method of claim 14, further comprising:
transmitting one or more signals associated with the second cell identifier after transmitting the indication of the conditional handover configuration.

22. The method of claim 14, wherein the relay node is an integrated access and backhaul node.

23. A method for wireless communications at a central node, comprising:
identifying a first cell identifier of a cell supported by a relay node in communication with a wireless node and the central node; and
transmitting, to the relay node, an indication to change the cell from the first cell identifier to a second cell identifier, the indication to change the cell from the first cell identifier to the second cell identifier based at least in part on a neighboring cell of the relay node being associated with the first cell identifier.

24. The method of claim 23, further comprising:
receiving, from a central entity, a signal indicating a change of the cell from the first cell identifier to the second cell identifier.

25. The method of claim 23, further comprising:
transmitting a conditional handover configuration to the wireless node based at least in part on a determination to change the cell from the first cell identifier to the second cell identifier, wherein the conditional handover configuration comprises one or more parameters of a conditional handover procedure to change the cell from the first cell identifier to the second cell identifier.

26. The method of claim 25, wherein the conditional handover configuration comprises a set of trigger conditions for the conditional handover procedure, wherein the set of trigger conditions comprises a time duration after receipt of the conditional handover configuration for the wireless node to initiate the conditional handover procedure, a signal quality of a signal associated with the first cell identifier falling below a first threshold, a signal quality of a signal associated with the second cell identifier exceeding a second threshold, or a relative signal quality between signals associated with the first cell identifier and the second cell identifier, or any combination thereof.

27. The method of claim 23, further comprising:
transmitting, to the relay node, an indication of a transition period for changing the cell from the first cell identifier to the second cell identifier.

28. The method of claim 27, wherein the transition period indicates a time period in which the relay node performs communications associated with both the first cell identifier and the second cell identifier.

29. The method of claim 23, further comprising:
transmitting the indication to change the cell from the first cell identifier to the second cell identifier via an application protocol interface.

30. An apparatus for wireless communications at a wireless node, comprising:
a processor,
memory coupled with the processor; and
instructions stored in the memory and executable by the processor to cause the apparatus to:
receive an indication of a conditional handover configuration that specifies a set of trigger conditions for a conditional handover procedure for a cell supported by a relay node in connection with the wireless node, the indication of the conditional handover configuration indicating a change of the cell from a first cell identifier to a second cell identifier; and
transmit, to the relay node and based at least in part on a trigger condition of the set of trigger conditions being satisfied, a random access message to initiate the conditional handover procedure for the cell from the first cell identifier to the second cell identifier.

* * * * *